US006681212B1

(12) United States Patent
Zeng

(10) Patent No.: US 6,681,212 B1
(45) Date of Patent: Jan. 20, 2004

(54) INTERNET-BASED AUTOMATED SYSTEM AND A METHOD FOR SOFTWARE COPYRIGHT PROTECTION AND SALES

(76) Inventor: Nianning Zeng, 6011 Bradley Blvd., Bethesda, MD (US) 20817

( * ) Notice: Subject to any disclaimer, the term of this patent is extended or adjusted under 35 U.S.C. 154(b) by 0 days.

(21) Appl. No.: 09/556,935

(22) Filed: Apr. 21, 2000

Related U.S. Application Data

(60) Provisional application No. 60/130,521, filed on Apr. 23, 1999.

(51) Int. Cl.[7] .............................................. G06F 17/60
(52) U.S. Cl. .......................... 705/51; 705/80; 380/255
(58) Field of Search ..................................... 705/80, 51

(56) References Cited

U.S. PATENT DOCUMENTS

| 4,118,789 | A | 10/1978 | Casto et al. |
| 4,183,085 | A | 1/1980 | Roberts et al. |
| 4,458,315 | A | 7/1984 | Uchenick |
| 4,462,078 | A | 7/1984 | Ross |
| 4,471,163 | A | 9/1984 | Donald et al. |
| 4,525,599 | A | 6/1985 | Curran et al. |
| 4,558,176 | A | 12/1985 | Arnold et al. |
| 4,573,119 | A | 2/1986 | Westheimer et al. |
| 4,593,353 | A | 6/1986 | Pickholtz |
| 4,649,510 | A | 3/1987 | Schmidt |
| 4,652,990 | A | 3/1987 | Pailen et al. |

(List continued on next page.)

FOREIGN PATENT DOCUMENTS

| JP | 2000076189 A | * | 3/2000 | ........... G06F/15/00 |
| WO | 98/02793 | | 1/1998 | |
| WO | 98/04974 | | 2/1998 | |
| WO | 98/53403 | | 11/1998 | |
| WO | 99/26123 | | 5/1999 | |
| WO | 99/41651 | | 8/1999 | |
| WO | 99/41657 | | 8/1999 | |
| WO | 99/41658 | | 8/1999 | |
| WO | 99/56195 | | 11/1999 | |
| WO | 99/56196 | | 11/1999 | |
| WO | 99/57723 | | 11/1999 | |
| WO | 99/57846 | | 11/1999 | |
| WO | 99/59287 | | 11/1999 | |
| WO | 99/60568 | | 11/1999 | |
| WO | 99/60748 | | 11/1999 | |
| WO | 99/63429 | | 12/1999 | |

OTHER PUBLICATIONS

HTTP://europa.eu.int/ISPO/legal/en/news/9904/chapter7.html, Nov. 5, 1999.*

*Primary Examiner*—James P. Trammell
*Assistant Examiner*—John M Winter
(74) *Attorney, Agent, or Firm*—Robert Platt Bell

(57) ABSTRACT

Copyrighted software may be executed only on an authorized computer by using a protection mechanism to restrain software to a designated machine. The protection mechanism includes a CIN (Computer Identification Number) reader and a CIN verifier. The CIN reader comprises a function call which reads CINs from the computer where the copyrighted software is intended to execute, and a converter which converts CINs to encrypted CINs. The CIN verifier comprises the encrypted authorized CINs and logic. The CIN may comprise the serial number of a computer chip, the serial number of a hard disk, the serial number of a computer operating system or the like. Protection mechanisms may be integrated into the copyrighted software at stop points by compiling the software source code or revising the executable code of the software. When the resulting protected software is processed on a computer, the protection mechanisms are executed at the stop points. The CIN verifiers then compare the encrypted authorized CINs with the encrypted read-in CINs. If the comparisons of the encrypted CINs match, the copyrighted software continues running. However, if the encrypted CINs are different, the protected software stops running and sends out a warning message.

57 Claims, 10 Drawing Sheets

U.S. PATENT DOCUMENTS

| | | | |
|---|---|---|---|
| 4,658,093 A | | 4/1987 | Hellman |
| 4,685,055 A | | 8/1987 | Thomas |
| 4,688,169 A | * | 8/1987 | Joshi .......................... 713/200 |
| 4,748,561 A | | 5/1988 | Brown |
| 4,796,220 A | * | 1/1989 | Wolfe .......................... 705/56 |
| 4,866,769 A | | 9/1989 | Karp |
| 4,999,806 A | | 3/1991 | Chernow et al. |
| 5,034,980 A | | 7/1991 | Kubota |
| 5,113,518 A | | 5/1992 | Durst, Jr. et al. |
| 5,182,770 A | | 1/1993 | Medveczky et al. |
| 5,199,066 A | * | 3/1993 | Logan ......................... 713/200 |
| 5,276,738 A | | 1/1994 | Hirsch |
| 5,287,407 A | | 2/1994 | Holmes |
| 5,287,408 A | | 2/1994 | Samson |
| 5,337,357 A | | 8/1994 | Chou et al. |
| 5,418,852 A | * | 5/1995 | Itami et al. .................... 360/60 |
| 5,483,658 A | | 1/1996 | Grube et al. |
| 5,490,216 A | | 2/1996 | Richardson et al. |
| 5,499,295 A | | 3/1996 | Cooper |
| 5,530,752 A | | 6/1996 | Rubin |
| 5,579,479 A | | 11/1996 | Plum |
| 5,586,186 A | | 12/1996 | Yuval et al. |
| 5,636,276 A | * | 6/1997 | Brugger ....................... 381/77 |
| 5,666,411 A | | 9/1997 | McCarty |
| 5,701,486 A | | 12/1997 | Gilbertsen et al. |
| 5,745,568 A | * | 4/1998 | O'Connor et al. ............ 705/56 |
| 5,752,054 A | | 5/1998 | Garber et al. |
| 5,754,646 A | | 5/1998 | Williams et al. |
| 5,754,761 A | | 5/1998 | Willsey |
| 5,754,864 A | | 5/1998 | Hill |
| 5,757,907 A | * | 5/1998 | Cooper et al. ................ 705/52 |
| 5,764,892 A | | 6/1998 | Cain et al. |
| 5,768,528 A | | 6/1998 | Stumm |
| 5,784,460 A | * | 7/1998 | Blumenthal et al. ........ 380/278 |
| 5,790,663 A | | 8/1998 | Lee et al. |
| 5,790,783 A | | 8/1998 | Lee et al. |
| 5,796,826 A | * | 8/1998 | Park .......................... 380/203 |
| 5,805,699 A | | 9/1998 | Akiyama et al. |
| 5,812,662 A | | 9/1998 | Hsu et al. |
| 5,870,543 A | | 2/1999 | Ronning |
| 5,887,060 A | | 3/1999 | Ronning |
| 5,918,213 A | | 6/1999 | Bernard et al. |
| 5,930,825 A | | 7/1999 | Nakashima et al. |
| 5,933,497 A | | 8/1999 | Beetcher et al. |
| 5,935,246 A | | 8/1999 | Benson |
| 5,946,497 A | | 8/1999 | Lee et al. |
| 5,950,173 A | | 9/1999 | Perkowski |
| 5,953,533 A | | 9/1999 | Fink et al. |
| 5,956,408 A | | 9/1999 | Arnold |
| 5,956,510 A | | 9/1999 | Nicholas |
| 5,982,887 A | | 11/1999 | Hirotani |
| 5,982,892 A | | 11/1999 | Hicks et al. |
| 5,991,399 A | | 11/1999 | Graunke et al. |
| 5,991,402 A | | 11/1999 | Jia et al. |
| 5,999,622 A | | 12/1999 | Yasukawa et al. |
| 6,006,190 A | | 12/1999 | Baena-Arnaiz et al. |
| 6,041,411 A | * | 3/2000 | Wyatt ......................... 713/200 |
| 6,055,503 A | * | 4/2000 | Horstmann .................... 705/1 |
| 6,134,659 A | * | 10/2000 | Sprong et al. .............. 713/190 |
| 6,243,468 B1 | * | 6/2001 | Pearce et al. ................ 380/255 |
| 6,247,131 B1 | * | 6/2001 | Kotani et al. ................ 713/200 |
| 6,453,369 B1 | * | 9/2002 | Imamura et al. .............. 710/36 |

* cited by examiner

INTERNET-BASED AUTOMATED SYSTEM AND A METHOD FOR SOFTWARE COPYRIGHT PROTECTION AND SALES

CROSS-REFERENCE TO RELATED APPLICATIONS

The present application claims priority from Provisional U.S. Patent Application Ser. No. 60/130,521, filed Apr. 23, 1999 and incorporated herein by reference in its entirety.

FIELD OF THE INVENTION

The present invention pertains to the field of copyright protection of computer software and more particularly to an Internet-based automated system and a method for automatically embedding protection mechanisms with computer identification numbers (CINs) into software and distributing the protected software to consumers over the Internet.

BACKGROUND OF THE INVENTION

Developing an easy, inexpensive, efficient, and reliable software copyright protection scheme has been a problem which has forever plagued the software industry. The Business Software Alliance estimates software developers and vendors lose billions of U.S. dollars each year from the unauthorized use and/or copying of their products.

For the purposes of the present application, the term "software" includes, but is not limited to computer programs, data, multimedia presentations, media files including audio and video data files, including music programs, movies, television, programs, and the like. Similarly, the term "computer" includes a computer system, home computer, laptop computer, palm computer, CD player, DVD player, or other media type player, as well as other types of computer controlled devices running software including industrial and robotic applications. The term "computer identification number" as used herein may include a computer processor serial number, hard drive serial number, operating system identification number, CD, DVD, or other media player serial number, or the like.

From the standpoint of preventing the unauthorized use of software, prior art software copyright protection methods may be broadly classified in three groups: hardware related methods, encrypted software methods, and non-encrypted software methods. All these methods involve trade-offs in terms of the level of protection, performance, costs, and ease of use.

In hardware related methods, the protection mechanism may need additional apparatus or hardware attached to a computer in order to properly function. Usually, this method may obtain a higher level of protection and security, but at the expense of increased cost and complexity. Because the cost of computer itself has continually reduced in recent years, this method becomes more and more unattractive in the field of software copyright protection.

In encrypted software methods, software may be disabled using various encryption algorithms and may be available only to someone who can restore the software to its original form through decryption. This encryption method generally does not require extra hardware. However, such encryption techniques may require users to provide additional information such as secure keys, which are distributed separately, to reassemble the program or decrypt the entitlement information and thus operate it.

The use of such keys may create severe performance degradation because of the overhead of verification. In addition, the use of encryption keys increases difficulty of use and has relatively high costs for each individual distribution. More importantly, one substantial drawback of this approach is it may not protect the copyright of software because a user can share the key and software with many others with no accountability to the copyright holder.

In non-encrypted software methods, the software contains some built-in machine specific information, and no secure keys are required to activate the software. The non-encrypted method is simple, efficient, and cost-effective, and provides a relatively high level of protection. However, non-encrypted methods may require a relatively complex processing and distributing system. Each copy of the protected software may require unique compilation by collecting individual consumer information and then distribution of the correct copy to an individual consumer. To date, due to the limitation of technologies in the past, this method has remained in the theoretical stage, and no related techniques have been proposed.

Recently, there have been significant developments in connection with the global information network called the World Wide Web. They include Hypertext Markup Language, Hypertext Transmission Protocol, GUI-based Internet navigation tools, Java™ Language, Virtual Reality Modeling Language, and the like. Such developments have not only made it very easy for companies to communicate with consumers for the purpose of advertising, selling, and maintaining their products and services, but also built up a very large and efficient information processing and software distributing system.

For example, it may be much more efficient and cost-effective to distribute software, digitally encoded music files, and even video files over the internet rather than distribute such data through traditional channels using physical media (e.g., CD-ROM, DVD, or the like). As the bandwidth of the internet increases through use of cable modems, ADSL modems, Network T1 or ISDN lines, distribution of both software (i.e., programs) and media (i.e, movies, music recordings, videos, and the like) will become more prevalent. However, software and media providers are reluctant to allow downloading of their products through the internet for fear of copyright piracy.

As a result, the demand for some type of non-encrypted software method has significantly increased. With the development of Internet Technologies, it is expected some type of non-encrypted software method will be universally accepted, as the efficiency of the processing and distributing system continuously increases while its maintenance costs decrease.

Thus, there exists a demand for a simple, low cost, efficient, and effective system and method for software copyright protection and sales with the state of the art technologies.

SUMMARY OF THE INVENTION

The present invention provides an Internet-based automated system and method for software copyright protection and sales. This automated system includes a Web server for receiving consumer requests; Web pages for providing a user interface; data processing programs for handling consumer purchase orders; daemons for automatically performing software protection process and automatically distributing protected software to consumers over the Internet; and a server database which stores consumer information, software information, distribution information, and purchase order information and the like.

The automated software protection process includes the steps of acquiring computer identification numbers; selecting purchased software; and embedding protection mechanisms into the purchased software at stop points by compiling the purchased software source code or revising the executable code of the purchased software.

The protection mechanism may comprise a CIN reader and a CIN verifier. The CIN reader may comprise a function call to automatically read the computer identification numbers from computers and a program to convert the computer identification numbers to the encrypted computer identification numbers by means of any of a number of protection methodologies. The CIN verifier comprises the encrypted authorized computer identification numbers and logic.

Another mechanism embodied herein includes identifying consumer computer operating systems and reading the computer identification numbers from consumer computers automatically.

Broadly speaking, in response to requests for purchasing software, the Internet-based automated system will take consumer information; read consumer computer identification numbers; store consumer information and the computer identification numbers into the database; select the purchased software; embed the protection mechanisms into the purchased software; and distribute the protected software program to consumers. The complete process may be automatically performed and controlled by the daemons and processing programs.

When the protected software is executed on a computer, the protection mechanisms are invoked at the stop points. Each CIN reader first reads at least one computer identification number from the computer and then converts them to the encrypted CINs. The CIN verifiers then compare the encrypted authorized computer identification numbers with the encrypted read-in computer identification numbers. If the encrypted authorized computer identification numbers match with the encrypted read-in computer identification numbers, the protected software continues running. Otherwise, the protected software terminates.

Further features and advantages of the present invention will be apparent hereinafter and in the Claims to Invention.

BRIEF DESCRIPTION OF THE DRAWINGS

For a more complete understanding of how to practice the Present Invention, the following Detailed Description of the Preferred Embodiments is considered in conjunction with the following drawings, in which.

Figure 1:
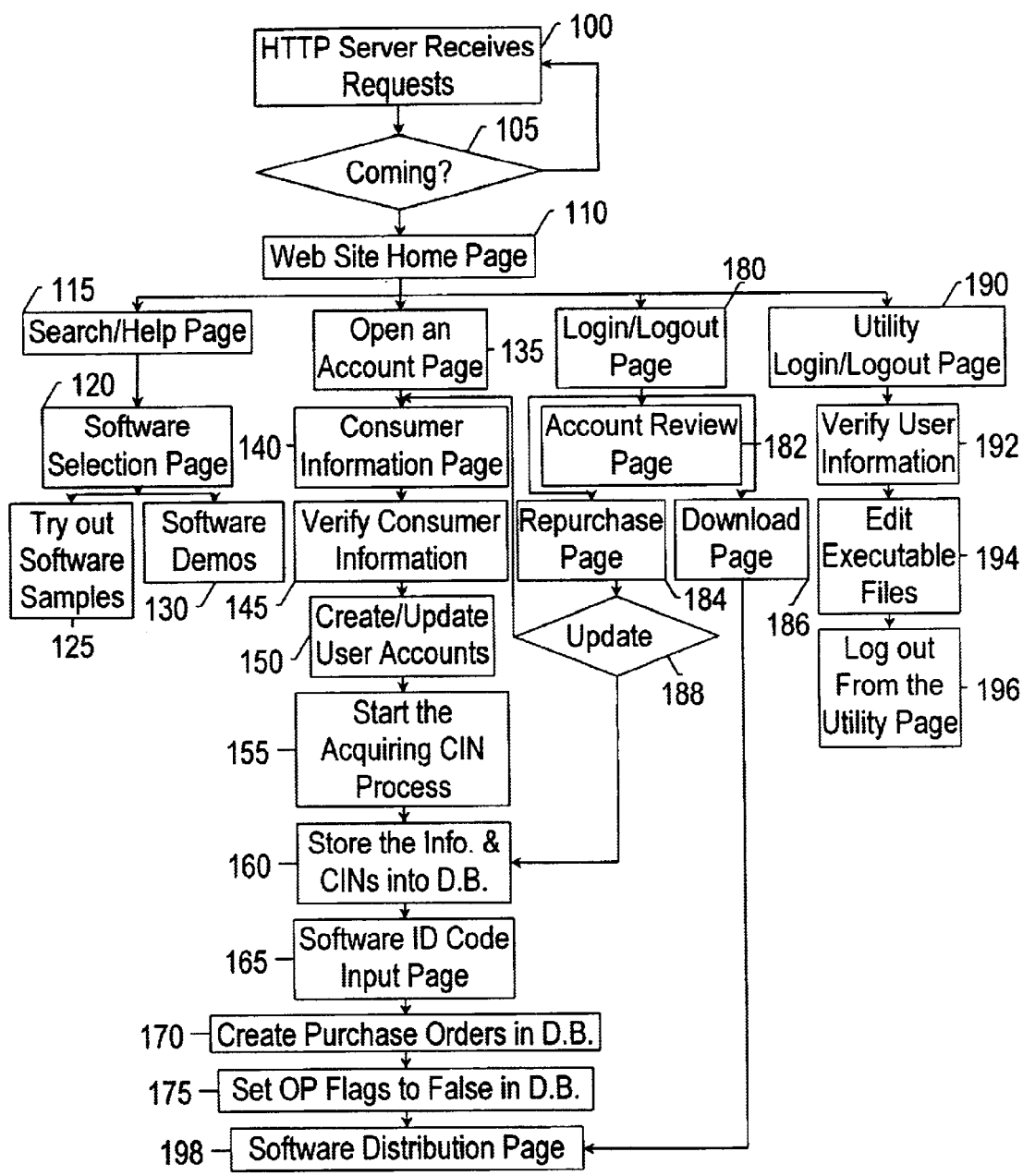
FIG. 1 is a flowchart of one embodiment of the acquiring and handling consumer information process of an Internet-based automated system for software copyright protection and sales in accordance with one embodiment of the present invention.

While the invention may be susceptible to various modifications and alternative forms, specific embodiments thereof are illustrated by way of example in the drawings and will herein be described in detail. It should be understood, however, the drawings and detailed description thereto are not intended to limit the invention to the particular form disclosed, but on the contrary, the invention is to cover all modifications, equivalents, and alternatives following within the spirit and scope of the present invention, as defined by the accompanying Claims to Invention.

DETAILED DESCRIPTION OF THE INVENTION

Figure 6:
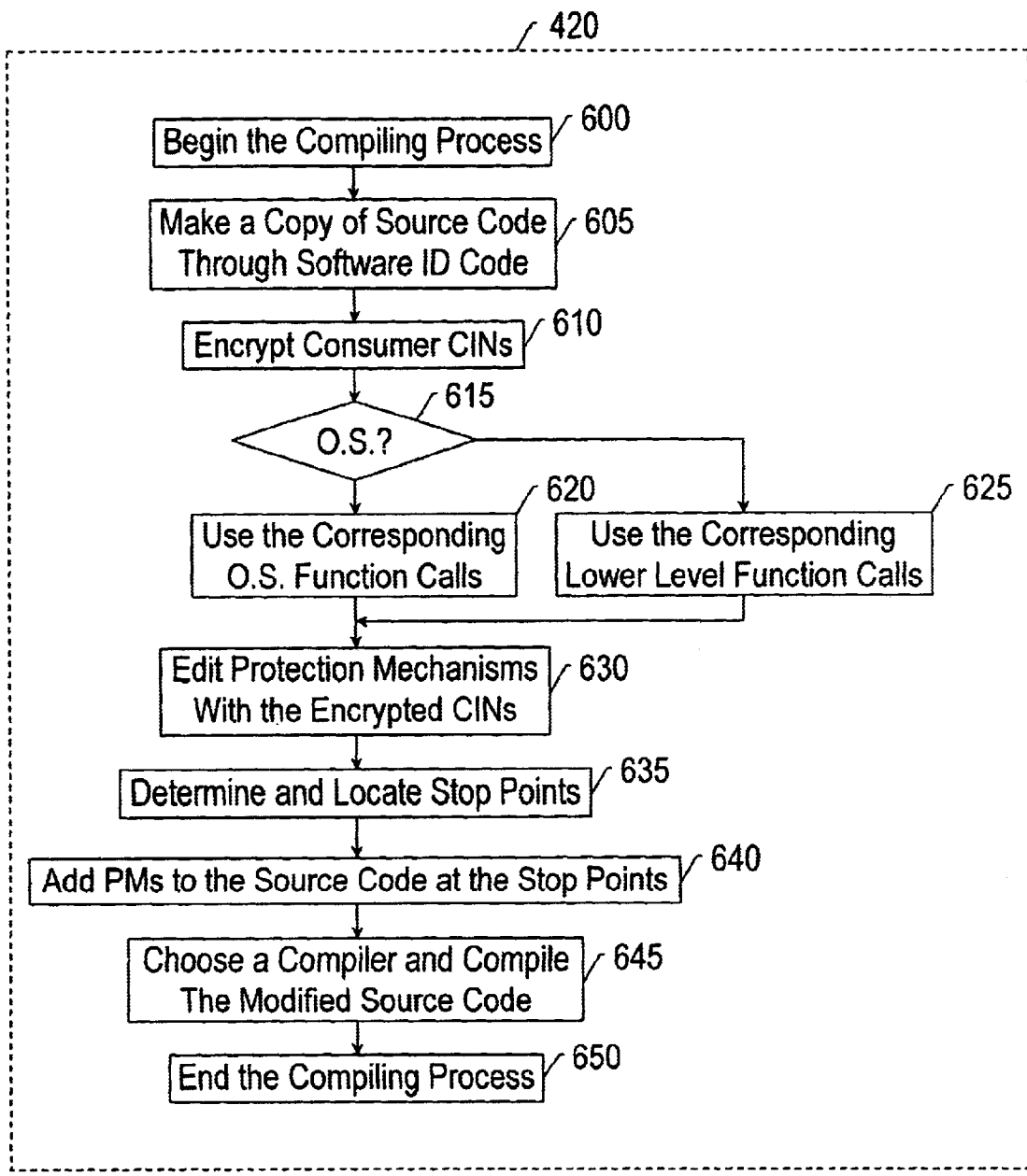
FIG. 6 is a flowchart depicting a software integration method for embedding the protection mechanisms by compiling the source code of the purchased software according to the present invention.
Figure 7:
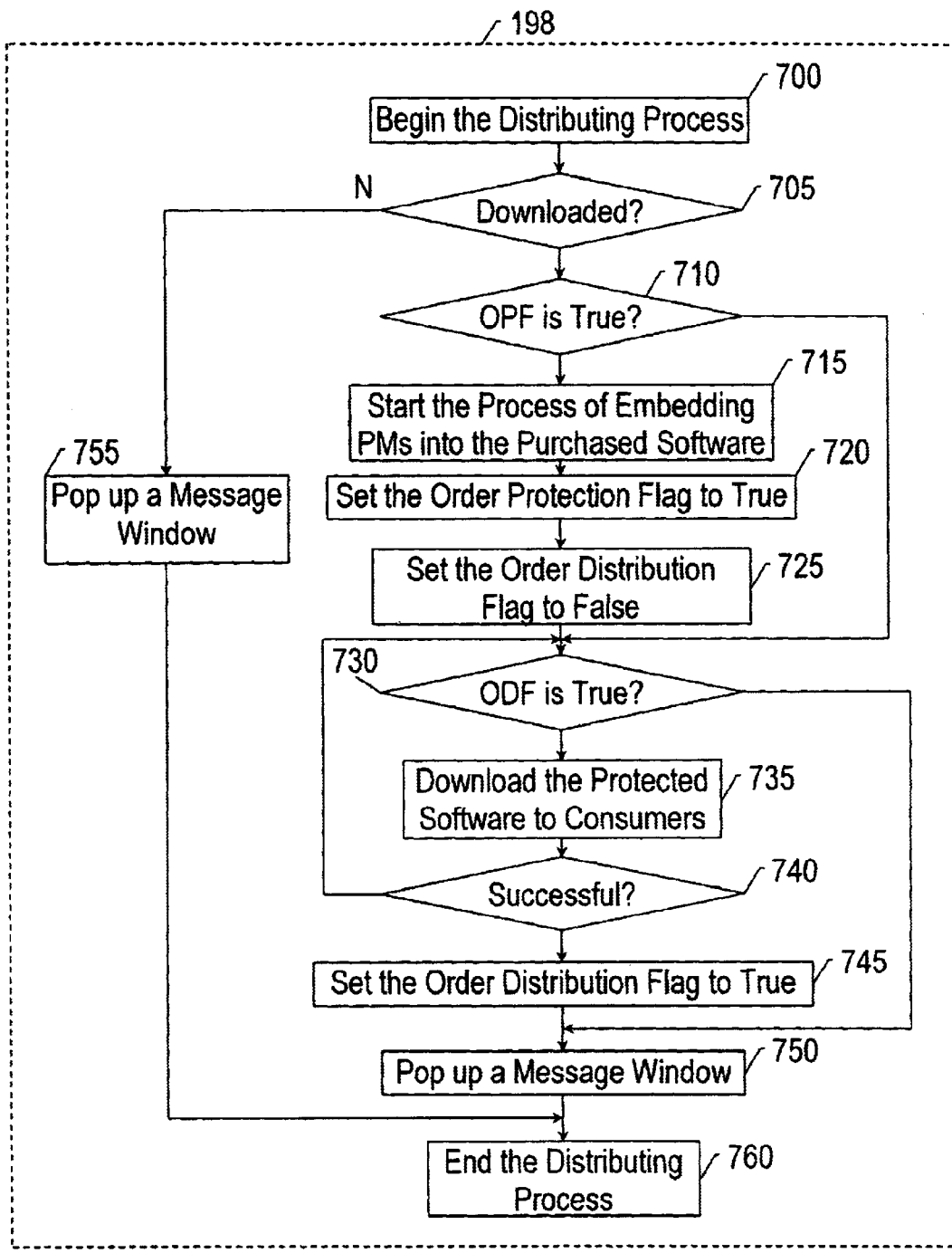
FIG. 7 is a flowchart of one embodiment of a process for distributing the protected software to consumers in accordance with one embodiment of the present invention.
Figure 8:
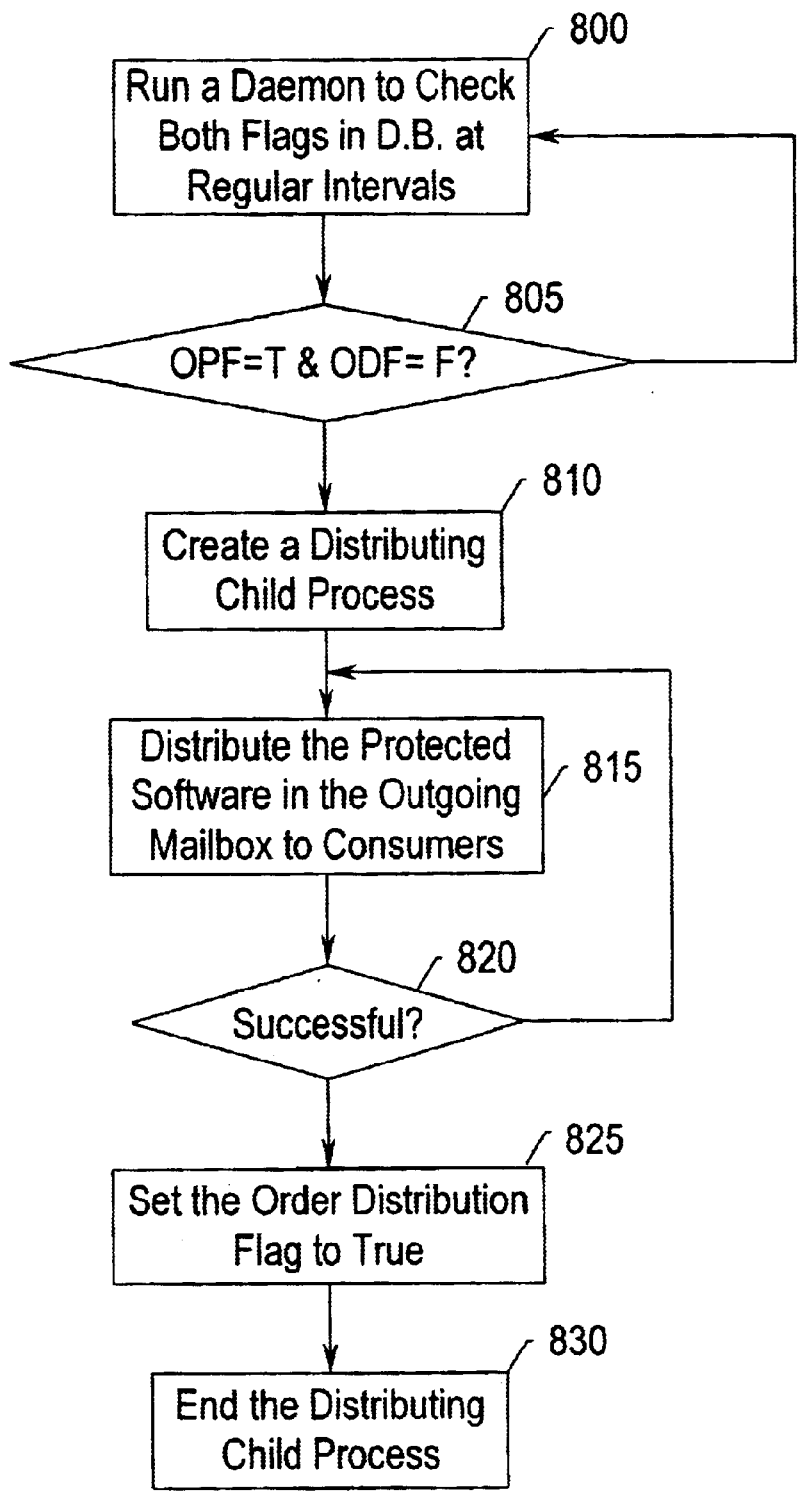
FIG. 8 is a flowchart of one embodiment of the automatic software distribution process of an Internet-based automated system for software copyright protection and sales in accordance with one embodiment of the present invention.

The Internet-based automated software copyright protection and sales system of the present invention generally comprises three subsystems and a server database. The subsystems are a data collection subsystem for acquiring and handling consumer information (FIG. 1 and FIG. 2); a software protection subsystem for automatically embedding the protection mechanisms into the purchased software (FIG. 3, FIG. 4, FIG. 5, and FIG. 6); and a software distribution subsystem for automatically transmitting the protected software to consumers over the Internet (FIG. 7 and FIG. 8).

Data Collection Subsystem

FIG. 1 is a flow diagram of depicting the data collection subsystem. The data collection subsystem includes HTTP server 100 running in background, receiving requests for consumer access. Home Page 110 of the Internet-based automated system of the present invention may pop up when a request comes through. Home Page 110 may provide consumers with at least four options: Search/Help Page 115, Open an Account Page 135, Login/Logout Page 180, and Utility Page 190.

Within Search/Help Page 115, Software Selection Page 120 may be available for consumers to select software they may wish to purchase. Each software may have an identification code. Titles of software, corresponding identification codes, and other information may be listed in Software Selection Page 120, which may be permanently stored in the server database. After selecting software, consumers may either try out the samples of the selected software in step 125 or view demonstrations in step 130. Search/Help Page 115 may also provide consumers with instructions for using the Internet-based automated system of the present invention.

Open an Account Page 135 may provide a Consumer Information Page 140, allowing consumers to input their names, mailing addresses, credit card numbers, telephone numbers, email addresses, the computer identification numbers, the computer operating systems they are using, and other such data. After verification of consumer information in step 145, the Internet-based automated system of the present invention creates an account for each consumer in step 150 by granting an account number and a password.

Figure 2:
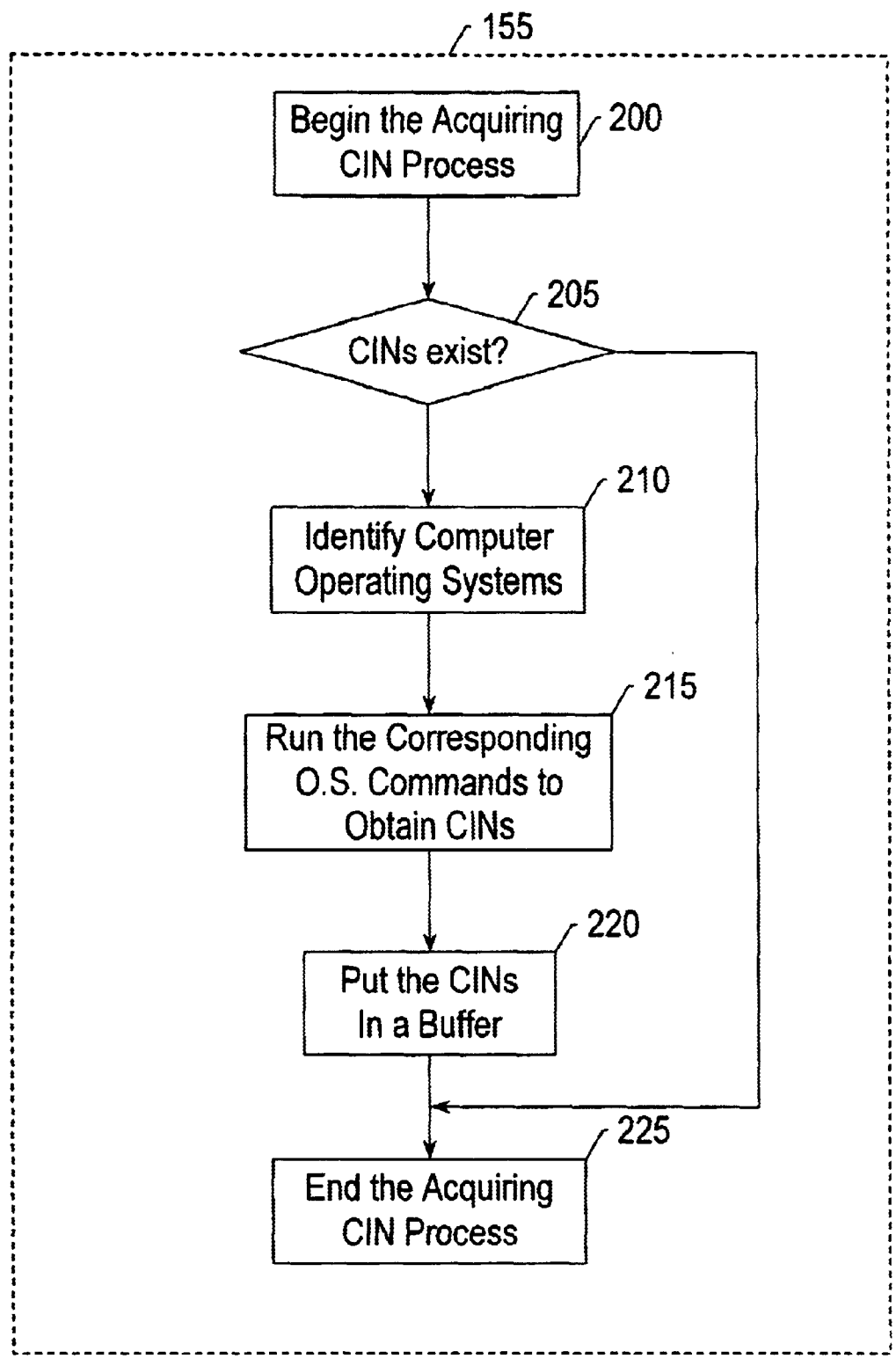
FIG. 2 is a flowchart illustrating automatically acquiring the computer identification numbers from a consumer computer in accordance with one embodiment of the present invention.

The Internet-based automated system of the present invention may then perform the process of automatically acquiring computer identification numbers from the consumer's computer in step 155 (illustrated in FIG. 2). The Internet-based automated system of the present invention may then store consumer information and computer identification numbers into the server database in step 160. Software Identification Code Input Page 165 may be used for consumers to input software identification codes which may be associated with purchased or selected software and obtained from Software Selection Page 120.

The Internet-based automated system of the present invention may then create a purchase order in step 170, including purchase order number, software identification code, customer account number, distribution identification number, order protection flag, order distribution flag, protection methodology code, purchase date and time, and distribution date and time. Next, the Internet-based automated system of the present invention may store the purchase order into the server database and then set a corresponding protection flag to false in step 175. Finally, the process of opening a consumer account is finished with the Distribution Page 198 (illustrated in FIG. 7).

Login/Logout Page 180 may first verify the consumer's account number and password. Then, it may provide three services for consumers through three Pages: Account Review Page 182, Repurchase Page 184, and Download Page 186. If any changes to consumer information are needed in step 188, the process may invoke Consumer Information Page 140. Otherwise, it may jump to Software Identification Code Input Page 165. Download Page 186 may be linked to Distribution Page 198 directly. Account Review Page 182 may be designed to allow consumers to examine their account information and purchase histories. Login/Logout Page 180 may also be employed for logging out from the Internet-based automated system of the present invention.

Utility Page 190 provides a tool for authorized users to edit executable files. Utility Page 190 may first verify user information such as user name and password in step 192. Authorized users may then be allowed to use the editing utility to edit executable files in step 194, and log out when finishing in step 196.

FIG. 2 is a flow diagram illustrating the process of automatically acquiring computer identification numbers from a consumer computer. First, the Internet-based automated system of the present invention may check, in step 205, to determine whether consumers have already provided their computer identification numbers through Consumer Information Page 140. Second, the Internet-based automated system of the present invention may identify which operating system the consumer computer is running (e.g., Windows™, MacIntosh™, UNIX, or the like) in step 210, if it is not already provided by the user. The type and version of operating system may be determined by creating a function call which comprises different operating system testing commands.

Then, the Internet-based automated system of the present invention may execute a function call which comprises either operating system commands or system calls to obtain the consumer's computer identification numbers in step 215. These function calls are similar or identical to Java™ Applet programs, which may be download from a Web page and run on a client machine. In consideration of the trade-off between the level of protection and efficiency, the computer identification numbers may be chosen from one or more of several candidates: the serial number of one or more computer chips (e.g., Pentium™ processor number), the serial number of one or more hard disks, the serial number of the computer operating system and the like. If the function call is successful, the consumer's computer identification numbers may be temperately put into a buffer in step 220.

Automated Software Protection Subsystem

Figure 3:
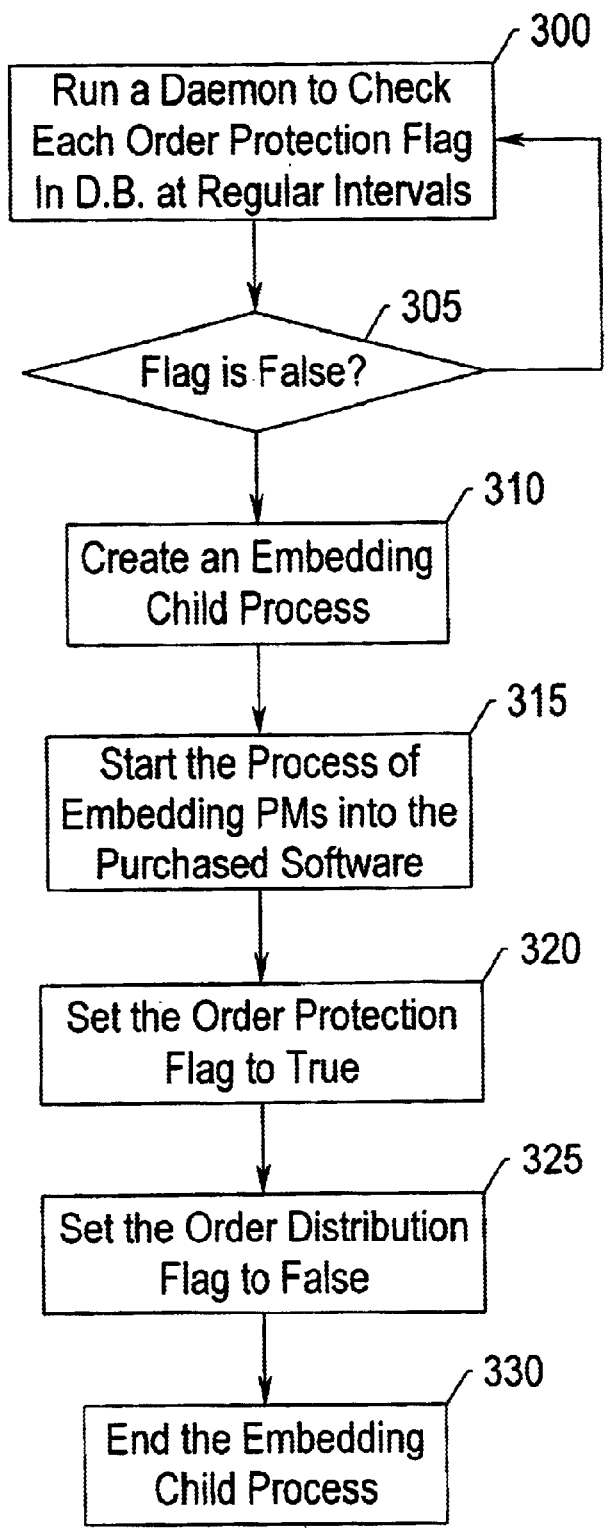
FIG. 3 is a flowchart of one embodiment of the automatic software protection process of an Internet-based automated system for software copyright protection and sales in accordance with one embodiment of the present invention.

FIG. 3 is a flowchart illustrating the automatic software protection subsystem. The process of FIG. 3 begins with running a daemon in the background. Daemons are processes which operate for a long time, and are often started when the system is bootstrapped and terminate only when the system is shutdown. The daemon may be generated to check the order protection flag for each purchase order in the server database at regular intervals in step 300. If the order protection flag is false in step 305, the daemon process may create a child process in step 310.

Figure 4:
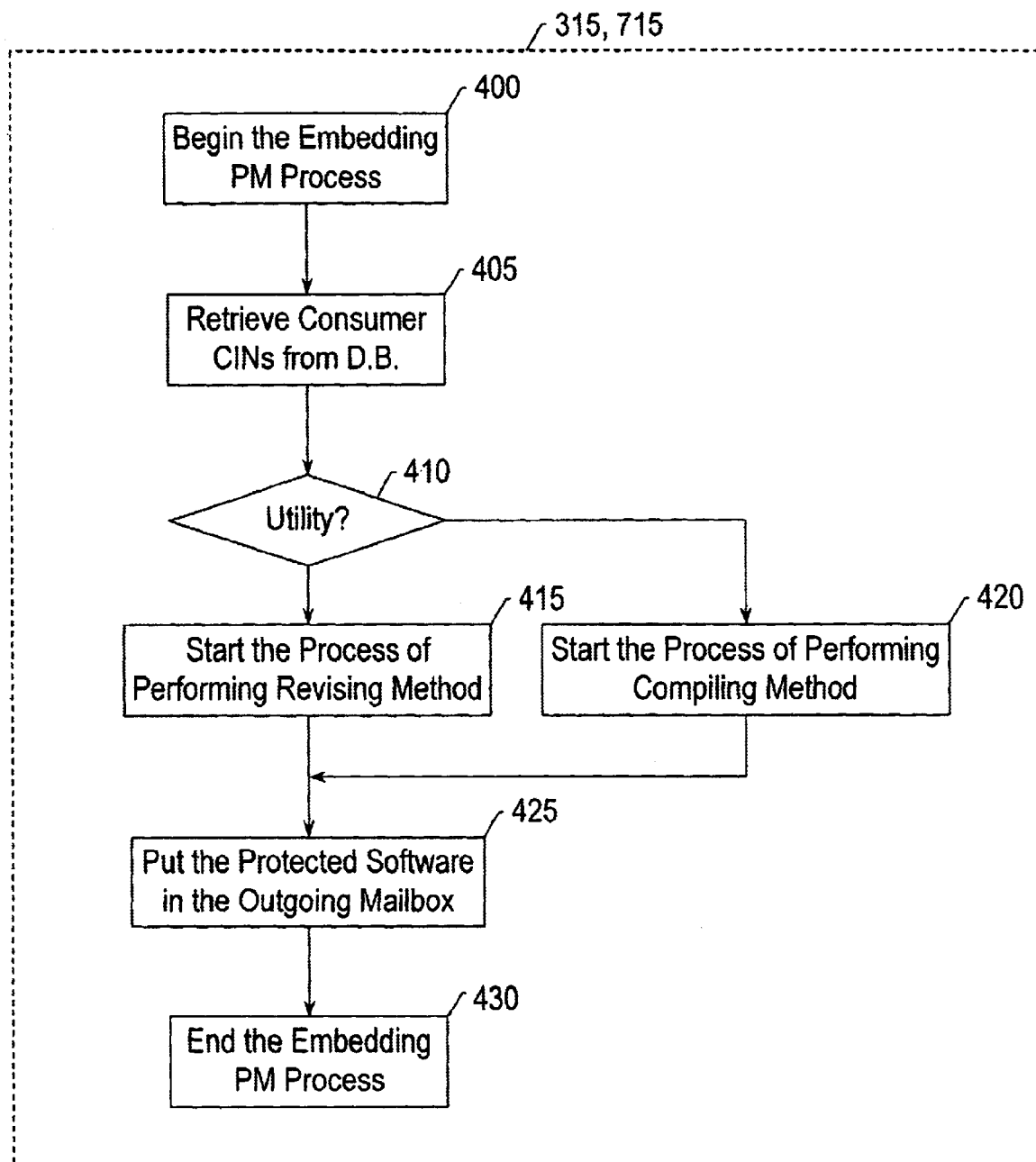
FIG. 4 is a flowchart of one embodiment of a process for embedding the protection mechanisms into the purchased software in accordance with one embodiment of the present invention.

The child process may then execute the process of embedding the protection mechanisms into the purchased software in step 315 (as illustrated in FIG. 4). After the embedding process is completed, the child process may then turn the order protection flag from false to true in step 320 and, at the same time, set the order distribution flag of the particular purchase order to false in step 325, indicating the purchase order has completed software protection and the protected software is ready for delivery. The child process may then be terminated in step 330. The advantage of running a daemon in the background is it may process the purchase orders 24 hours a day without substantial human intervention.

Figure 5:
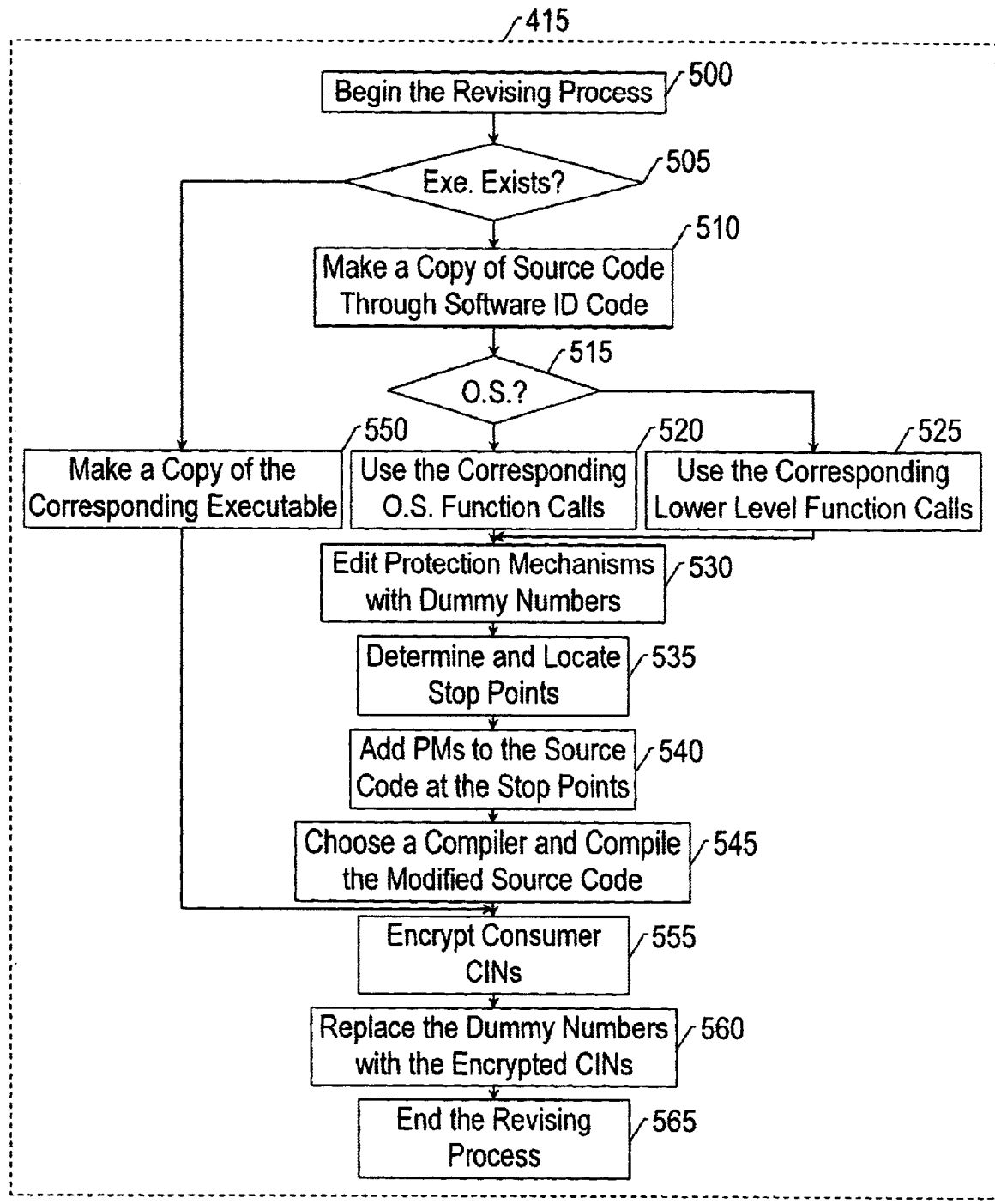
FIG. 5 is a flowchart depicting a software integration method for embedding the protection mechanisms by revising the executable of the purchased software according to the present invention.

FIG. 4 is a flowchart illustrating the process for embedding protection mechanism(s) into purchased or selected software. When the embedding process is executed in step 400, it may first retrieve computer identification numbers associated with the purchase order from a server database in step 405. In step 410, it is determined whether a revising utility is available. The revising utility may modify an executable file instead of editing, compiling, and linking the corresponding source code. The embedding process uses the revising method to embed the protection mechanisms into purchased or selected software in step 415 (as illustrated in FIG. 5) if the utility is available. Otherwise, it may exploit the compiling method instead in step 420 (as illustrated in FIG. 6).

After the software is fully protected, it may reside in a an outgoing mailbox directory in step 425 and is ready to be transmitted to a consumer. At the same time, the path of the protected software in the outgoing mailbox may also be stored into the server database.

FIG. 5 is a flowchart illustrating the process of embedding protection mechanisms into purchased or selected software using the revising method. The revising process ensures an executable file of protected software containing dummy numbers exists in step 505. If the executable file is not present, the revising process makes a copy of the purchased or selected software source code in step 510 according to the software identification code obtained from Software Selection Page 120.

If the purchased software is classified as an operating system in step 515, the revising process may employ corresponding lower level functions calls to read in computer identification numbers from a consumer computer directly in step 525. Otherwise, it may use corresponding operating system function calls to read in computer identification numbers through a consumer computer operating system in step 520.

The revising process may then edit protection mechanisms in step 530, each of which may comprise two parts: a CIN reader and a CIN verifier. The CIN reader comprises a function call (either a lower level function call or an operating system function call) and a converter. The function call may automatically read a computer or player identification number (e.g., processor number, player serial number, or the like) from a consumer computer or player.

The converter is a program which converts computer identification numbers to the encrypted computer identification numbers by means of any of a number of different protection methodologies known in the art.

The CIN verifier may comprise dummy numbers and logic. The protection methodologies in the protection mechanisms may vary with the purchased software and depend on the level of protection. Existing protection methodologies (i.e., encryption techniques) could be adopted or new protection methodologies may also be applied. It should be noted the protection methodologies may be easily and frequently adjusted against attacks from pirates. Thus, software may be effectively protected against the unauthorized use.

Thus, the present invention is not dependent upon any particular type of encryption or protection methodology. One of the important features of the present invention is that it allows any one of a number of encryption or protection methodologies to be employed to encrypt CIN information or protect programs. If a particular encryption or protection technology is compromised, the system of the present invention can be quickly and easily updated to a more sophisticated methodology without having to scrap or rework the existing system.

After generating protection mechanisms, the revising process determines stop points in step 535, where execution of the software may be terminated if a computer is not authorized to run the software. Stop points could be in multiple places and put in any part of the source code. The revising process may then add protection mechanisms to the stop points in step 540. A compiler may then be chosen according to the purchased or selected software, and the modified source code may be compiled in step 545 using the compiler. At this point, an executable file of the protected software with dummy numbers is generated, which is later transformed to an executable file with the encrypted computer identification numbers.

Next, the revising process encrypts the computer identification numbers using the same converter as in the protection mechanisms of step 555. The revising process then replaces, by means of the revising utility, the dummy numbers with the encrypted computer identification numbers in step 560. In the beginning of the revising process, if an executable file of the protected software with dummy numbers already exists, the revising process makes a copy of the executable file in step 550 and then jumps to the procedure in step 555. Again, the computer or player identification numbers could be serial numbers of computer chips, serial numbers of hard disks, serial numbers of computer operating systems, player serial numbers, or the like.

FIG. 6 is a flowchart illustrating the process of embedding the protection mechanism into purchased software using the compiling method. Likewise the revising method, the compiling process first makes a copy of the purchased software source code in step 605 according to the software identification code obtained from the Software Selection Page 120. It then encrypts the computer identification numbers using the same converter as in the protection mechanism of step 610. If the purchased or selected software is categorized as an operating system in step 615, the compiling process may use corresponding lower level function calls to read in computer identification numbers from the consumer computer directly in step 625.

Otherwise, it may employ corresponding operating system function calls to read in computer identification numbers through the computer operating system in step 620. When an appropriate function call is selected, the compiling process edits the protection mechanisms in step 630, each of which contains a CIN reader and a CIN verifier. The CIN reader may comprise the same function calls and the same converter as illustrated in FIG. 5. The CIN verifier, however, comprises logic and the encrypted authorized computer identification numbers instead of the dummy numbers.

The compiling process may then determine stop points in step 635. Protection mechanisms may then be added to the stop points in step 640. A compiler may then be chosen according to the purchased software, and the modified source code is compiled using the compiler in step 645. Consequently, the protected software executable file with the encrypted authorized computer identification numbers is generated. Comparing the revising process with the compiling process, one may find the revising process is more efficient because it compiles the modified source code for specified software only once. But a revising utility which is able to edit an executable file may also be indispensable for certain applications.

Automated Software Distribution Subsystem

FIG. 7 is a flowchart of depicting the distribution process of the Internet-based automated system of the present invention. The distributing process starts with a Dialog Page 705 to ask consumers if they want to download the protected software or want it to be electronically mailed. It also informs consumers the downloading process may take a while and makes sure the consumer wants to wait.

If a consumer chooses an electronic mail option, the distributing process pops up a Message Window 755 stating that the software will be electronically mailed to the consumer, and then terminates. A distributing daemon will handle the request later and electronically mail the protected software to the consumer (illustrated in FIG. 8).

Otherwise, the distributing process checks the status of the order protection flag in step 710. If the flag is false, the distributing process executes the process of embedding the protection mechanisms into the purchased software in step 715 (illustrated in FIG. 4). When the embedding process is completed, the distributing process sets the order protection flag to true in step 720, and at the same time, sets the order distribution flag to false in step 725. If the status of the order protection flag is true in step 710, the distributing process further checks the status of the order distribution flag in step 730. If the order distribution flag is false, the distributing process invokes the downloading process in step 735 to transmit the protected software to consumers. Otherwise, it pops up a Message Window 750, which tells consumers the purchased software has already been downloaded.

When the downloading process in step 735 is finished, the distributing process checks if the download is successful in step 740. If it is successful, the distributing process sets the order distribution flag to true in step 745 and invokes the Message Page 750 and then terminates. However, if the download is unsuccessful, the distributing process goes back to checking the status of the order distribution flag in step 730.

FIG. 8 is a flowchart illustrating an automatic process of electronic mailing the protected software to consumers. The electronic mailing process starts with running another daemon in the background to check both the order protection flag and the order distribution flag in the server database at regular intervals in step 800. If the order protection flag is true and the order distribution flag is false in step 805, the electronic mailing process creates a child process in step 810.

The child process then mails electronically the protected software residing in the outgoing mailbox to the consumer, which may be identified through the purchase order number in the server database in step 815. At the same time, a CD-ROM containing the protected software may be made and sent out by post later. If the electronic mail is unsuccessful in step 820, the child process goes back and re-sends the protected software again. Otherwise, the child process sets the order distribution flag to true in step 825 and then terminates.

Figure 9:
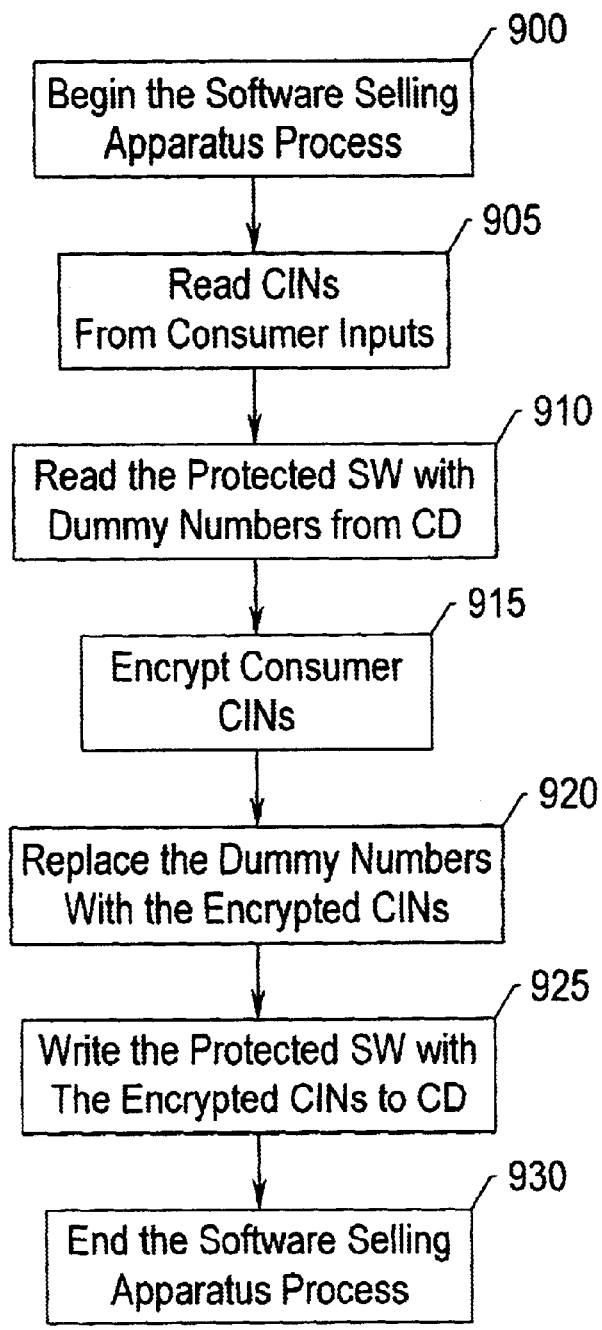
FIG. 9 is a flowchart of an embodiment of an apparatus for selling the CD-ROM which contains the protected software with dummy numbers in accordance with one embodiment of the present invention.

FIG. 9 is a flowchart illustrating the process for an apparatus to sell the protected software stored in a CD-ROM. This embodiment of the present invention allows consumers to obtain software without the need for downloading, which may be time consuming and error-prone. In addition, this embodiment of the present invention provides a mechanism whereby DVD videos, music CD, video games, computer software, and the like may be sold through retail outlets while providing a copy protection mechanism which is both effective and easy to use.

In order to sell the protected software to consumers in regular shopping stores, a CD-ROM may be made which contains the protected software which has the embedded protection mechanisms with dummy numbers. The protected software in the CD-ROM may be edited by using a special utility, which is available in the Internet-based automated system of the present invention (See FIG. 1). But only authorized users such as retail stores may access it.

The selling apparatus first reads in computer identification numbers, which may be provided by consumers, from user input in step 905. Secondly it reads in the protected software with dummy numbers from the CD-ROM in step 910. Then it encrypts the consumer computer identification numbers in step 915 using the same converter as in the protection mechanisms. By means of the special utility, the selling apparatus is and then able to replace the dummy numbers in the protected software with the encrypted computer identification numbers in step 920.

After finishing the replacement, the selling apparatus writes the protected software with the encrypted authorized computer identification numbers back to the CD-ROM in step 925. The selling apparatus of the present invention could be a regular computer or a much simpler computer-like device provided in a store as a kiosk or stand-alone display, or as a special device operated by store personnel.

Figure 10:
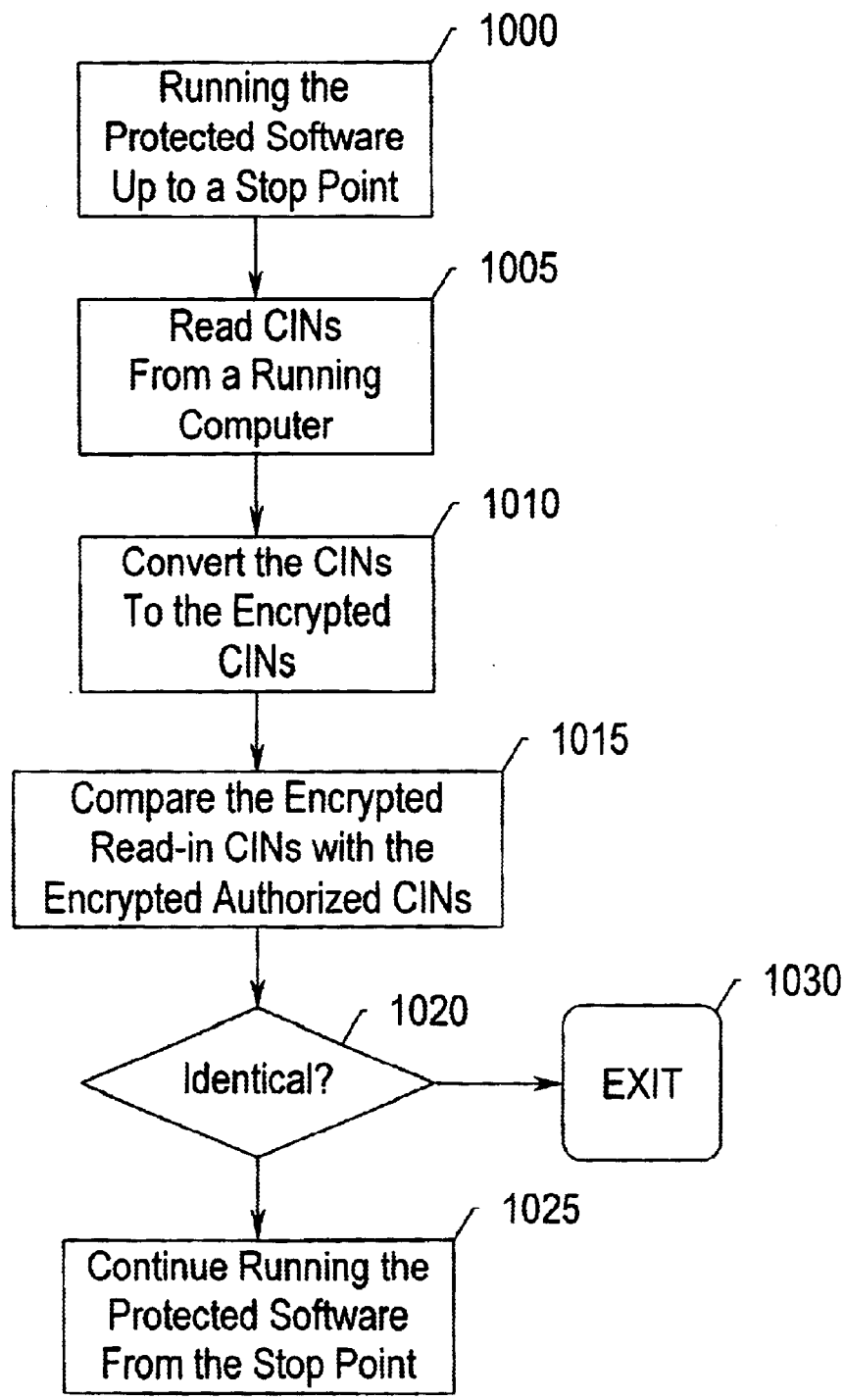
FIG. 10 is a block diagram illustrating the concept of the software protection mechanism in accordance with one embodiment of the present invention.

FIG. 10 is a block diagram illustrating the concept of the software copyright protection method of the present invention. In the diagram, the following definitions are used: the copyrighted software means the software which is registered for copyright or protectable under copyright laws; the protected software means the software containing the protection mechanisms of the present invention.

As mentioned above, the protection mechanism comprises a CIN reader and a CIN verifier. The CIN reader contains a function call and a converter. The CIN verifier contains an encrypted authorized computer identification numbers and logical expressions. The protection mechanism may be placed in anywhere of the copyrighted software. Generally speaking, while the protected software is running, the protection mechanisms will be activated at the stop points in step 1000.

When a protection mechanism is executed, it first calls the CIN reader to read in the running computer identification numbers in step 1005 and convert them to the encrypted computer identification numbers in step 1010. The protection mechanism may then invoke the CIN verifier to compare the encrypted read-in computer identification numbers with the encrypted authorized computer identification numbers in step 1015, which have been embedded in the copyrighted software.

If the comparison is satisfied in step 1020, the protected software continues running in step 1025. Otherwise, the protected software terminates in step 1030.

Server Database

The server database may comprise the following tables: a consumer information table, a software information table, a distribution information table, a purchase order table, and similar tables. The consumer information table contains a customer account number and all the consumer information namely: name, mailing address, telephone number, email address, credit card number, the computer identification numbers, the encrypted computer identification numbers, the type of operating system and the like, as well as consumer demographic information.

The software information table may include a software identification code, the price of software, the type of software, the title of software, the version number of software, manufacturer, the location of software source code, the location of the executable file with dummy numbers and the like. The distribution information table may contain a distribution identification number, the location of the protected software, the type of distribution and the like.

The purchase order table may comprise a purchase order number, a customer account number, a software identification code, a distribution identification number, an order protection flag, an order distribution flag, a protection methodology code, the purchase date and time, the distributing date and time and the like.

The present invention provides several advantages over prior art protection schemes. For example, the type of encryption methodology used to protect the software may be changed from time to time (or from vendor to vendor, or the like) without necessitating any hardware changes for the consumer. The encrypted computer identification number (CIN) may be encrypted using any one (or more) of a number of encryption techniques, as the software provided to the consumer will decrypt this number and compare it to the consumer's CIN. Thus, if a particular encryption technique is compromised, encryption software may be upgraded for subsequent downloads or sales in a manner transparent to the end user.

While the preferred embodiment and various alternative embodiments of the invention have been disclosed and described in detail herein, it may be apparent to those skilled in the art that various changes in form and detail may be made therein without departing from the spirit and scope thereof.

For example, while the preferred embodiment of the present invention is described in terms of downloading software from a website through the internet, the method and apparatus of the present invention may also be applied to other, more conventional streams of distributions. For example, a kiosk or booth may be provided in a retail store for selling software or media products to consumers. A consumer may enter his computer identification number(s) and the software or media product may be downloaded to a CD-ROM, DVD, or other physical media.

Note also that the computer identification number may comprise an identification number for a DVD player, CD player, or other media device. Once embedded into the software, the identification number may be pre-programmed into the consumer's appliances in order to run the software or pay the media.

Note again that for the purposes of this application, the term 'software' is used to include not only traditional computer software applications and operating systems, but also media files and data including movies, television programs, audio recordings, videos, and multi-media presentations. The present invention may be applied to all such types of data and programs and in no way is limited only to one form of data or program. Similarly, the term "computer" includes a computer system, home computer, laptop computer, palm computer, CD player, DVD player, or other media type player, as well as other types of computer controlled devices running software including industrial and robotic applications. The term "computer identification number" as used herein may include a computer processor serial number, hard drive serial number, operating system identification number, CD, DVD, or other media player serial number, or the like.

I claim:

1. A system for software copyright protection and sales, said system on a server comprising:
    a data collection subsystem including means for receiving requests to purchase software over a network and generating software purchase information in response to such requests;
    acquiring means, coupled to the data collection subsystem, for acquiring at least one computer identification number (CIN) from a consumer computer;
    encryption means, coupled to the acquiring means and the data collection subsystem, for encrypting the at least one CIN from a consumer computer to produce an encrypted authorized CIN using a protection methodology, said protection methodology means including a null encryption of the CIN producing the CIN as the encrypted CIN; and
    a software protection subsystem, including automated embedding means for automatically embedding at least one protection mechanism into software selected for purchase to produce protected software, the embedded protection mechanism including:
        the said at least one encrypted authorized CIN,
        means for reading the said at least one CIN from a consumer computer,
        means for encrypting the said at least one CIN from a consumer computer to produce at least one encrypted CIN using said protection methodology,
        means for comparing the said at least one encrypted CIN from the consumer computer with the said at least one encrypted authorized CIN in the protection mechanism, and
        means for halting and continuing processing of the software if the said encrypted authorized CIN does not match the said at least one encrypted CIN from the consumer computer; and
    a software distribution subsystem, coupled to the software protection subsystem, for distributing the protected software to consumers over a network,
    wherein the protected software distributed by the software distribution system, when activated, retrieves and encrypts at least one CIN from a consumer computer and compares the encrypted CIN from the consumer computer with the at least one encrypted authorized CIN in the protection mechanism and halts processing of the software if the encrypted authorized CIN does not match the at least one encrypted CIN from the consumer computer.

2. The system of claim 1, wherein said software protection subsystem comprises:
    means for embedding at least one dummy number into software selected for purchase;
    means for reading in said at least one CIN from a consumer computer;
    means for converting said at least one CIN to at least one encrypted CIN using a protection methodology; and
    means for replacing said at least one embedded dummy number with the at least one encrypted CIN.

3. The system of claim 1, wherein said acquiring means comprises means for automatically retrieving at least one of a computer processor serial number, a hard disk drive serial number, and an operating system serial number, as a CIN.

4. The system of claim 1, wherein said software protection subsystem comprises:
    means for editing executable software to replace a dummy number with said at least one encrypted CIN; and
    means for placing the protected software to an outgoing mailbox for transmission to at least one consumer.

5. The system of claim 1, wherein said software includes at least one of audio, video, and vocal products, including CDs and DVDs, wherein said software protection subsystem comprises means for embedding said protection mechanisms into at least one of audio, video and vocal products, said CIN comprises at least one player identification number, and said means for reading comprises means for reading in the player identification numbers from consumer players.

6. The system of claim 1, wherein said software protection subsystem comprises means for automatically editing at least a portion of an executable file to place at least a portion of said protection mechanisms into the executable file to produce said protected software.

7. The system of claim 1, wherein said software protection subsystem comprises:
    means for automatically editing at least a portion of software source code to place at least one said protection mechanism into at least one predetermined stop point, where execution of the purchased software is terminated if a computer is not authorized to run the purchased software, in the software selected for purchase; and
    means for at least one of compiling and linking the at least a portion of source code to produce said protected software.

8. The system of claim 1, wherein said acquiring means comprises:

means for identifying a consumer computer operation system where the protected software will be executed; and means for automatically retrieving at least one of a computer processor serial number, a hard disk drive serial number, an operating system serial number, and a hardware serial numbers from a consumer computer.

9. A system for software copyright protection and sales, said system comprising:

a data collection subsystem including a server for receiving requests to purchase software over a network and generating software purchase information in response to such requests;

acquiring means, coupled to the data collection subsystem, for acquiring at least one computer identification number (CIN) from a consumer computer;

encryption means, coupled to the acquiring means, for encrypting the at least one CIN to produce an encrypted authorized CIN;

a software protection subsystem, coupled to the encryption means, for embedding at least one protection mechanism into software selected for purchase to produce protected software, the embedded protection mechanism including:

the at least one encrypted authorized CIN, means for reading at least one CIN from a consumer computer, means for encrypting the at least one CIN from a consumer computer, means for comparing the at least one encrypted CIN from the consumer computer with the at least one encrypted authorized CIN in the protection mechanism, and means for halting and continuing processing of the software if the encrypted authorized CIN does not match the at least one encrypted CIN from the consumer computer; and a software distribution subsystem, coupled to the software protection subsystem, for distributing the protected software to consumers over a network, wherein the protected software distributed by the software distribution system, when activated, retrieves and encrypts at least one CIN from a consumer computer and compares the encrypted CIN from the consumer computer with the at least one encrypted authorized CIN in the protection mechanism and halts processing of the software if the encrypted authorized CIN does not match the at least one encrypted CIN from the consumer computer, wherein said software protection subsystem comprises:
means for editing executable software to replace a dummy number with said at least one encrypted CIN; and
means for placing the protected software to an outgoing mailbox for transmission to at least one consumer, and wherein said software protection subsystem further comprises:
first means for determining whether an executable file with dummy numbers of the purchased software exists;
second means, coupled to said first means, for making a copy of the purchased software source code if an executable file with dummy numbers of the purchased software does not exist as determined by said first means;
third means, coupled to said second means, for determining and locating stop points in the purchased software where execution of the purchased software is terminated if a computer is not authorized to run the purchased software;
fourth means, coupled to said third means, for adding said protection mechanisms to said stop points in the purchased software;
fifth means, coupled to said fourth means, for selecting a compiler and at least one of compiling and linking at least a portion of the modified purchased software source code using the compiler to generate said protected software;
sixth means, coupled to said first means and said fifth means, for encrypting said at least one CIN using a protection methodology to produce said at least one encrypted CIN, regardless of whether an executable file with dummy numbers of the purchased software does exist as determined by said first means; and
seventh means, coupled to said sixth means for replacing said embedded dummy numbers with said at least one encrypted CIN, to produce embedded encrypted computer identification numbers.

10. The system of claim 9, wherein said software protection subsystem comprises:
means for embedding at least one dummy number into software selected for purchase;
means for reading in said at least one CIN from a consumer computer;
means for converting said at least one CIN to at least one encrypted CIN using a protection methodology; and
means for replacing said at least one embedded dummy number with the at least one encrypted CIN.

11. The system of claim 9, wherein said acquiring means comprises means for automatically retrieving at least one of a computer processor serial number, a hard disk drive serial number, and an operating system serial number, as a CIN.

12. The system of claim 9, wherein said software includes at least one of audio, video, and vocal products, including CDs and DVDs, wherein said software protection subsystem comprises means for embedding said protection mechanisms into at least one of audio, video and vocal products, said CIN comprises at least one player identification number, and said means for reading comprises means for reading in the player identification numbers from consumer players.

13. A system for software copyright protection and sales, said system comprising:

a data collection subsystem including a server for receiving requests to purchase software over a network and generating software purchase information in response to such requests;

acquiring means, coupled to the data collection subsystem, for acquiring at least one computer identification number (CIN) from a consumer computer;

encryption means, coupled to the acquiring means, for encrypting the at least one CIN to produce an encrypted authorized CIN;

a software protection subsystem, coupled to the encryption means, for embedding at least one protection mechanism into software selected for purchase to produce protected software, the embedded protection mechanism including:

the at least one encrypted authorized CIN, means for reading at least one CIN from a consumer computer, means for encrypting the at least one CIN from a consumer computer, means for comparing the at least one encrypted CIN from the consumer computer with the at least one encrypted authorized CIN in the protection mechanism, and means for halting and continuing processing of the software if the encrypted authorized CIN does not match the at least one encrypted CIN from the consumer computer; and a software distribution subsystem, coupled to the software protection subsystem, for distributing the protected software to consumers over a network, wherein the protected software distributed by the software distribution system, when activated, retrieves and encrypts at least one CIN from a consumer computer and compares the encrypted CIN from the consumer computer with the at least one encrypted authorized CIN in the protection mechanism and halts processing of the software if the encrypted authorized CIN does not match the at least one encrypted CIN from the consumer computer, and wherein said software protection subsystem comprises:

means for adding into a protection mechanism said at least one encrypted CIN;

means for embedding said protection mechanism into the purchased software source code; and means for at least one of compiling and linking at least a portion of the purchased software source code to produce the compiled purchased software embedded with the protection mechanism.

14. The system of claim 13, wherein said means for embedding the protection mechanisms into the purchased software further comprises:

first means for making a copy of the purchased software source code;

second means, coupled to said first means, for encrypting said at least one CIN using a protection methodology;

third means, coupled to said second means, for determining and locating stop points in the purchased software;

fourth means, coupled to said third means, for adding said protection mechanism to said stop points in the purchased software; and fifth means, coupled to said fourth means, for selecting a compiler and at least one of compiling and linking at least a portion of the modified purchased software source code using the compiler to generate said protected software.

15. The system of claim 13, wherein said software protection subsystem comprises:

means for embedding at least one dummy number into software selected for purchase;

means for reading in said at least one CIN from a consumer computer;

means for converting said at least one CIN to at least one encrypted CIN using a protection methodology; and means for replacing said at least one embedded dummy number with the at least one encrypted CIN.

16. The system of claim 13, wherein said acquiring means comprises means for automatically retrieving at least one of a computer processor serial number, a hard disk drive serial number, and an operating system serial number, as a CIN.

17. The system of claim 13, wherein said software protection subsystem comprises:

means for editing executable software to replace a dummy number with said at least one encrypted CIN; and means for placing the protected software to an outgoing mailbox for transmission to at least one consumer.

18. The system of claim 13, wherein said software includes at least one of audio, video, and vocal products, including CDs and DVDs, wherein said software protection subsystem comprises means for embedding said protection mechanisms into at least one of audio, video and vocal products, said CIN comprises at least one player identification number, and said means for reading comprises means for reading in the player identification numbers from consumer players.

19. A method for software copyright protection and sales, said method comprising the steps of:

receiving requests to purchase software over a network and generating software purchase information in response to such requests, acquiring at least one computer identification number (CIN) from a consumer computer, encrypting the at least one CIN from a consumer computer using a predetermined protection methodology to produce an encrypted authorized CIN, said protection methodology including a null encryption of the CIN producing the CIN as the encrypted CIN, automatically embedding at least one protection mechanism into software selected for purchase to produce protected software, the embedded protection mechanism including the at least one encrypted authorized CIN encrypted using said protection methodology, means for reading at least one CIN from a consumer computer, means for encrypting the at least one CIN from a consumer computer using said protection methodology, means for comparing the at least one encrypted CIN from the consumer computer with the at least one encrypted authorized CIN in the protection mechanism, and means for halting and continuing processing of the software if the encrypted authorized CIN does not match the at least one encrypted CIN from the consumer computer, and distributing the protected software to consumers over a network, wherein the protected software, when activated, retrieves and encrypts at least one CIN from a consumer computer using said protection methodology and compares the encrypted CIN from the consumer computer with the at least one encrypted CIN in the protection mechanism and halts processing of the software if the encrypted authorized CIN does not match the encrypted CIN from the consumer computer.

20. The method of claim 19, wherein said step of embedding a protection mechanism into software selected for purchase comprises the steps of:

embedding at least one dummy number into software selected for purchase, reading in said at least one CIN from a consumer computer, converting said at least one CIN to at least one encrypted CIN using a protection methodology, and replacing said at least one embedded dummy number with the at least one encrypted CIN.

21. The method of claim 19, wherein said step of acquiring comprises the step of automatically retrieving at least one of a computer processor serial number, a hard disk drive serial number, and an operating system serial number, as a CIN.

22. The method of claim 19, wherein said step of embedding the protection mechanisms into the purchased software comprises the steps of:

editing executable software to replace a dummy number with said at least one encrypted CIN, and placing the protected software to an outgoing mailbox for transmission to at least one consumer.

23. The method of claim 19, wherein said software includes at least one of audio, video and vocal products, including CDs and DVDs, wherein said step of embedding comprises the step of embedding said protection mechanisms into at least one of audio, video and vocal products, the CIN comprises at least one player identification number, and said step of acquiring comprises the steps of reading in the player identification numbers from consumer players.

24. The method of claim 19, wherein said step of automatically embedding further comprises the step of automatically editing at least a portion of an executable file to place at least a portion of the protection mechanisms into the executable file to produce the protected software.

25. The method of claim 19, wherein said step of automatically embedding further comprises the steps of:

automatically editing at least a portion of software source code to place at least one the protection mechanism into at least one predetermined stop point, where execution of the purchased software is terminated if a computer is not authorized to run the purchased software, in the software selected for purchase, and at least one of compiling and linking the at least a portion of source code to produce the protected software.

26. The method of claim 19, wherein said step of acquiring comprises the steps of:

identifying a consumer computer operation method where the protected software will be executed, and automatically retrieving at least one of a computer processor serial number, a hard disk drive serial number, an operating system serial number, and a hardware serial numbers from a consumer computer.

27. A method for software copyright protection and sales, said method comprising the steps of:

receiving requests to purchase software over a network and generating software purchase information in response to such requests, acquiring at least one computer identification number (CIN) from a consumer computer, encrypting the at least one CIN to produce an encrypted authorized CIN, embedding at least one protection mechanism into software selected for purchase to produce protected software, the embedded protection mechanism including the at least one encrypted authorized CIN, means for reading at least one CIN from a consumer computer, means for encrypting the at least one CIN from a consumer computer, means for comparing the at least one encrypted CIN from the consumer computer with the at least one encrypted authorized CIN in the protection mechanism, and means for halting and continuing processing of the software if the encrypted authorized CIN does not match the at least one encrypted CIN from the consumer computer, and distributing the protected software to consumers over a network, wherein the protected software, when activated, retrieves and encrypts at least one CIN from a consumer computer and compares the encrypted CIN from the consumer computer with the at least one encrypted CIN in the protection mechanism and halts processing of the software if the encrypted authorized CIN does not match the encrypted CIN from the consumer computer, wherein said step of embedding the protection mechanisms into the purchased software comprises the steps of:

editing executable software to replace a dummy number with said at least one encrypted CIN, and placing the protected software to an outgoing mailbox for transmission to at least one consumer, and wherein said step of embedding the protection mechanisms into the purchased software further comprises the steps of:

determining whether an executable file with dummy numbers of the purchased software exists, making a copy of the purchased software source code if an executable file with dummy numbers of the purchased software does not exist as determined by said first means, determining and locating stop points in the purchased software where execution of the purchased software is terminated if a computer is not authorized to run the purchased software, adding said protection mechanisms to said stop points in the purchased software, selecting a compiler and at least one of compiling and linking at least a portion of the modified purchased software source code using the compiler to generate said protected software, encrypting said at least one CIN using a protection methodology to produce said at least one encrypted CIN, regardless of whether an executable file with dummy numbers of the purchased software does exist, and replacing said embedded dummy numbers with said at least one encrypted CIN, to produce embedded encrypted computer identification numbers.

28. The method of claim 27, wherein said step of embedding a protection mechanism into software selected for purchase comprises the steps of:

embedding at least one dummy number into software selected for purchase, reading in said at least one CIN from a consumer computer, converting said at least one CIN to at least one encrypted CIN using a protection methodology, and replacing said at least one embedded dummy number with the at least one encrypted CIN.

29. The method of claim 27, wherein said step of acquiring comprises the step of retrieving at least one of a computer processor serial number, a hard disk drive serial number, and an operating system serial number, as a CIN.

30. The method of claim 27, wherein said software includes at least one of audio, video and vocal products, including CDs and DVDs, wherein said step of embedding comprises the step of embedding said protection mechanisms into at least one of audio, video and vocal products, the CIN comprises at least one player identification number, and said step of acquiring comprises the steps of reading in the player identification numbers from consumer players.

31. A method for software copyright protection and sales, said method comprising the steps of:

receiving requests to purchase software over a network and generating software purchase information in response to such requests, acquiring at least one computer identification number (CIN) from a consumer computer, encrypting the at least one CIN to produce an encrypted authorized CIN, embedding at least one protection mechanism into software selected for purchase to produce protected software, the embedded protection mechanism including the at least one encrypted authorized CIN, means for reading at least one CIN from a consumer computer, means for encrypting the at least one CIN from a consumer computer, means for comparing the at least one encrypted CIN from the consumer computer with the at least one encrypted authorized CIN in the protection mechanism, and means for halting and continuing processing of the software if the encrypted authorized CIN does not match the at least one encrypted CIN from the consumer computer, and distributing the protected software to consumers over a network, wherein the protected software, when activated, retrieves and encrypts at least one CIN from a consumer computer and compares the encrypted CIN from the consumer computer with the at least one encrypted CIN in the protection mechanism and halts processing of the software if the encrypted authorized CIN does not match the encrypted CIN from the consumer computer, and wherein said step of embedding the protection mechanisms into the purchased software comprises the steps of:

adding into a protection mechanism said at least one encrypted CIN, embedding said protection mechanism into the purchased software source code, and at least one of compiling and linking at least a portion of the purchased software source code to produce the compiled purchased software embedded with the protection mechanism.

32. The method of claim 31, wherein said step of embedding the protection mechanisms into the purchased software further comprises the steps of:

making a copy of the purchased software source code, encrypting said at least one CIN using a protection methodology, determining and locating stop points in the purchased software, adding said protection mechanism to said stop points in the purchased software, and selecting a compiler and at least one of compiling and linking at least a portion of the modified purchased software source code using the compiler to generate said protected software.

33. The method of claim 31, wherein said step of embedding a protection mechanism into software selected for purchase comprises the steps of:

embedding at least one dummy number into software selected for purchase, reading in said at least one CIN from a consumer computer, converting said at least one CIN to at least one encrypted CIN using a protection methodology, and replacing said at least one embedded dummy number with the at least one encrypted CIN.

34. The method of claim 31, wherein said step of acquiring comprises the step of automatically retrieving at least one of a computer processor serial number, a hard disk drive serial number, and an operating system serial number, as a CIN.

35. The method of claim 31, wherein said step of embedding the protection mechanisms into the purchased software comprises the steps of:

editing executable software to replace a dummy number with said at least one encrypted CIN, and placing the protected software to an outgoing mailbox for transmission to at least one consumer.

36. The method of claim 31, wherein said software includes at least one of audio, video and vocal products, including CDs and DVDs, wherein said step of embedding comprises the step of embedding said protection mechanisms into at least one of audio, video and vocal products, the CIN comprises at least one player identification number, and said step of acquiring comprises the steps of reading in the player identification numbers from consumer players.

37. A computer readable media containing a plurality of instruction steps for controlling a computer readable media, the computer readable media comprising:

a software program for performing a predetermined function, said software program comprising at least one executable binary program file;

at least one stop point within the software program for halting processing of the software program; and at least one protection mechanism embedded into the at least one executable binary program file of the software program, the protection mechanism including at least one encrypted authorized computer identification number (CIN), means for automatically reading at least one CIN from a consumer computer, means for encrypting the at least one CIN from a consumer computer, means for comparing the at least one encrypted CIN from the consumer computer with the at least one encrypted authorized CIN in the protection mechanism, and means for halting and continuing processing of the software if the encrypted authorized CIN does not match the at least one encrypted CIN from the consumer computer, wherein the protection mechanism, when activated, retrieves and encrypts a CIN from a consumer computer and compares the encrypted CIN from the consumer computer with the at least one encrypted CIN in the protection mechanism and halts processing of the software at the stop point if the encrypted authorized CIN does not match the encrypted CIN from the consumer computer.

38. The computer readable media of claim 37, wherein said protection mechanism retrieves at least one of a computer processor serial number, a hard disk drive serial number, and an operating system serial number, as a CIN.

39. The computer readable media of claim 37, wherein said software includes at least one of audio, video and vocal products, said computer readable medium includes CDs and DVDs, wherein protection mechanism is embedded into at least one of audio, video and vocal products, and said CIN comprises at least one player identification number.

40. A computer readable media containing a plurality of instruction steps for controlling a computer readable media, the computer readable media comprising:

a software program for performing a predetermined function;

at least one stop point within the software program for halting processing of the software program; and at least one protection mechanism embedded into the software program, the protection mechanism including at least one encrypted authorized computer identification number (CIN), means for reading at least one CIN from a consumer computer, means for encrypting the at least one CIN from a consumer computer, means for comparing the at least one encrypted CIN from the consumer computer with the at least one encrypted authorized CIN in the protection mechanism, and means for halting and continuing processing of the software if the encrypted authorized CIN does not match the at least one encrypted CIN from the consumer computer, and wherein the protection mechanism, when activated, retrieves and encrypts a CIN from a consumer computer and compares the encrypted CIN from the consumer computer with the at least one encrypted CIN in the protection mechanism and halts processing of the software at the stop point if the encrypted authorized CIN does not match the encrypted CIN from the consumer computer, wherein said software protection mechanism comprises:
means for editing executable software to replace a dummy number with said at least one encrypted CIN; and
means for placing the protected software to an outgoing mailbox for transmission to at least one consumer, and wherein said software protection mechanism further comprises:
first means for determining whether an executable file with dummy numbers of the purchased software exists;
second means, coupled to said first means, for making a copy of the purchased software source code if an executable file with dummy numbers of the purchased software does not exist as determined by said first means;
third means, coupled to said second means, for determining and locating stop points in the purchased software where execution of the purchased software is terminated if a computer is not authorized to run the purchased software;
fourth means, coupled to said third means, for adding said protection mechanisms to said stop points in the purchased software;
fifth means, coupled to said fourth means, for selecting a compiler and at least one of compiling and linking at least a portion of the modified purchased software source code using the compiler to generate said protected software;
sixth means, coupled to said first means and said fifth means, for encrypting said at least one CIN using a protection methodology to produce said at least one encrypted CIN, regardless of whether an executable file with dummy numbers of the purchased software does exist as determined by said first means; and
seventh means, coupled to said sixth means for replacing said embedded dummy numbers with said at least one encrypted CIN, to produce embedded encrypted computer identification numbers.

41. The computer readable media of claim 40, wherein said protection mechanism retrieves at least one of a computer processor serial number, a hard disk drive serial number, an operating system serial number, as a CIN.

42. The computer readable media of claim 40, wherein said software includes at least one of audio, video and vocal products, said computer readable medium includes CDs and DVDs, wherein protection mechanism is embedded into at least one of audio, video and vocal products, and said CIN comprises at least one player identification number.

43. A computer readable media containing a plurality of instruction steps for controlling a computer readable media, the computer readable media comprising:

a software program for performing a predetermined function;
at least one stop point within the software program for halting processing of the software program; and
at least one protection mechanism embedded into the software program, the protection mechanism including at least one encrypted authorized computer identification number (CIN), means for reading at least one CIN from a consumer computer, means for encrypting the at least one CIN from a consumer computer, means for comparing the at least one encrypted CIN from the consumer computer with the at least one encrypted authorized CIN in the protection mechanism, and means for halting and continuing processing of the software if the encrypted authorized CIN does not match the at least one encrypted CIN from the consumer computer, and
wherein the protection mechanism, when activated, retrieves and encrypts a CIN from a consumer computer and compares the encrypted CIN from the consumer computer with the at least one encrypted CIN in the protection mechanism and halts processing of the software at the stop point if the encrypted authorized CIN does not match the encrypted CIN from the consumer computer,
wherein said software protection mechanism comprises:
means for adding into a protection mechanism said at least one encrypted CIN;
means for embedding said protection mechanism into the purchased software source code; and
means for at least one of compiling and linking at least a portion of the purchased software source code to produce the compiled purchased software embedded with the protection mechanism.

44. The computer readable media of claim 43, wherein said protection mechanism retrieves at least one of a computer processor serial number, a hard disk drive serial number, an operating system serial number, as a CIN.

45. The computer readable media of claim 43, wherein said software includes at least one of audio, video and vocal products, said computer readable medium includes CDs and DVDs, wherein protection mechanism is embedded into at least one of audio, video and vocal products, and said CIN comprises at least one player identification number.

46. A system for software copyright protection and sales, said system on a server comprising:

a data collection subsystem including means for receiving requests to purchase software over a network and generating software purchase information in response to such requests;
encryption means, coupled to the data collection subsystem, for encrypting at least one computer identification number (CIN) from a consumer computer to produce at least one encrypted authorized CIN using a protection methodology, said protection methodology means including a null encryption of the CIN producing the CIN as the encrypted CIN; and
a software protection subsystem including automated embedding means for automatically embedding at least one protection mechanism into software selected for purchase to produce the protected software, the said embedded protection mechanism including:
the said at least one encrypted authorized CIN,
means for reading in the said at least one CIN from a consumer computer,
means for encrypting the said at least one CIN from a consumer computer to produce at least one encrypted CIN using the said protection methodology, means for comparing the said at least one encrypted CIN from the consumer computer with the said at least one encrypted authorized CIN in the protection mechanism, and
means for halting and continuing processing of the software if the said encrypted authorized CIN does not match the said at least one encrypted CIN from the consumer computer; and
a software distribution subsystem, coupled to the software protection subsystem, for distributing the protected software to consumers over a network,
wherein the protected software distributed by the software distribution system, when activated, retrieves and encrypts at least one CIN from a consumer computer and compares the encrypted CIN from the consumer computer with the at least one encrypted authorized CIN in the protection mechanism and halts processing of the software if the encrypted authorized CIN does not match the at least one encrypted CIN from the consumer computer,
wherein said software protection subsystem comprises:
means for automatically editing at least a portion of an executable file to place at least a portion of said protection mechanisms into the executable file to produce the protected software; and
wherein said software protection subsystem further comprises:
first means for determining whether an executable file embedded with at least one protection mechanism containing at least one predetermined dummy number of the purchased software exists;
second means, coupled to said first means, for making a copy of the purchased software source code if an executable file with the at least one dummy number of the purchased software does not exist as determined by said first means;
third means, coupled to said second means, for locating said stop points in the purchased software;
fourth means, coupled to said third means, for adding said protection mechanisms containing at least one dummy number to the said stop points in the purchased software;
fifth means, coupled to said fourth means, for selecting a compiler and at least one of compiling and linking the modified at least a portion of the purchased software source code using the compiler to generate said executable file;
sixth means, coupled to said first means and said fifth means, for encrypting said at least one CIN using a protection methodology to produce at least one said encrypted authorized CIN, regardless of whether an executable file with the at least one dummy number of the purchased software does exist as determined by said first means; and
seventh means, coupled to said sixth means, for replacing said embedded dummy numbers with said at least one encrypted authorized CIN to generate said protected software.

47. A system for software copyright protection and sales, said system on a server comprising:
a data collection subsystem including means for receiving requests to purchase software over a network and generating software purchase information in response to such requests;
encryption means, coupled to the data collection subsystem, for encrypting at least one computer identification number (CIN) from a consumer computer to produce at least one encrypted authorized CIN using a protection methodology, said protection methodology means including a null encryption of the CIN producing the CIN as the encrypted CIN; and
a software protection subsystem including automated embedding means for automatically embedding at least one protection mechanism into software selected for purchase to produce the protected software, the said embedded protection mechanism including:
the said at least one encrypted authorized CIN,
means for reading in the said at least one CIN from a consumer computer,
means for encrypting the said at least one CIN from a consumer computer to produce at least one encrypted CIN using the said protection methodology,
means for comparing the said at least one encrypted CIN from the consumer computer with the said at least one encrypted authorized CIN in the protection mechanism, and
means for halting and continuing processing of the software if the said encrypted authorized CIN does not match the said at least one encrypted CIN from the consumer computer; and
a software distribution subsystem, coupled to the software protection subsystem, for distributing the protected software to consumers over a network,
wherein the protected software distributed by the software distribution system, when activated, retrieves and encrypts at least one CIN from a consumer computer and compares the encrypted CIN from the consumer computer with the at least one encrypted authorized CIN in the protection mechanism and halts processing of the software if the encrypted authorized CIN does not match the at least one encrypted CIN from the consumer computer, and
wherein said software protection subsystem comprises:
means for automatically editing at least a portion of software source code to place at least one said protection mechanism into at least one said predetermined stop point in the software selected for purchase;
means for at least one of compiling and linking the at least a portion of the software source code to produce the protected software embedded with the protection mechanisms; and
wherein said software protection subsystem further comprises:
first means for making a copy of the at least a portion of the purchased software source code;
second means, coupled to said first means, for encrypting said at least one CIN using a protection methodology to produce said at least one encrypted CIN;
third means, coupled to said second means, for adding into a protection mechanism said at least one encrypted CIN to produce embedded encrypted authorized CIN;
fourth means, coupled to said third means, for locating stop points in the at least a portion of the purchased software;
fifth means, coupled to said fourth means, for adding said protection mechanisms to said stop points in the at least a portion of the purchased software source code; and
sixth means, coupled to said fifth means, for selecting a compiler and at least one of compiling and linking the modified at least a portion of the purchased software source code using the compiler to generate said protected software.

48. A system for software copyright protection and sales, said system on a server comprising:
a data collection subsystem including means for receiving requests to purchase software over a network and generating software purchase information in response to such requests;
encryption means, coupled to the data collection subsystem, for encrypting the at least one CIN from a consumer computer to produce an encrypted authorized CIN using a protection methodology, said protection methodology means including a null encryption of the CIN producing the CIN as the encrypted CIN; and
a software protection subsystem including automated embedding means for automatically embedding at least one protection mechanism into software selected for purchase to produce protected software, the embedded protection mechanism including:
the said at least one encrypted authorized CIN,
means for reading the said at least one CIN from a consumer computer,
means for encrypting the said at least one CIN from a consumer computer to produce at least one encrypted CIN using said protection methodology,
means for comparing the said at least one encrypted CIN from the consumer computer with the said at least one encrypted authorized CIN in the protection mechanism, and
means for halting and continuing processing of the software if the said encrypted authorized CIN does not match the said at least one encrypted CIN from the consumer computer; and
a software distribution subsystem including means for distributing the protected software to consumers through at least one of a network and mail,
wherein the protected software distributed by the software distribution system, when activated, retrieves and encrypts at least one CIN from a consumer computer and compares the encrypted CIN from the consumer computer with the at least one encrypted authorized CIN in the protection mechanism and halts processing of the software if the encrypted authorized CIN does not match the at least one encrypted CIN from the consumer computer.

49. The system of claim 48, wherein said software protection subsystem comprises means for automatically editing at least a portion of an executable file to place at least a portion of said protection mechanisms into the executable file to produce said protected software.

50. The system of claim 48, wherein said software protection subsystem comprises:
means for automatically editing at least a portion of software source code to place at least one said protection mechanism into at least one predetermined stop point, where execution of the purchased software is terminated if a computer is not authorized to run the purchased software, in the software selected for purchase; and
means for at least one of compiling and linking the at least a portion of source code to produce said protected software.

51. The system of claim 48, further comprising:
means for identifying a consumer computer operation system where the protected software will be executed; and
means for automatically retrieving at least one of a computer processor serial number, a hard disk drive serial number, an operating system serial number, and a hardware serial numbers from a consumer computer.

52. A method for software copyright protection and sales on a server, said method comprising the steps of:
receiving requests to purchase software over a network and generating software purchase information in response to such requests,
encrypting the at least one CIN from a consumer computer using a predetermined protection methodology to produce an encrypted authorized CIN, said protection methodology including a null encryption of the CIN producing the CIN as the encrypted CIN,
automatically embedding at least one protection mechanism into software selected for purchase to produce protected software, the embedded protection mechanism including the at least one encrypted authorized CIN encrypted using said protection methodology, means for reading at least one CIN from a consumer computer, means for encrypting the at least one CIN from a consumer computer using said protection methodology, means for comparing the at least one encrypted CIN from the consumer computer with the at least one encrypted authorized CIN in the protection mechanism, and means for halting and continuing processing of the software if the encrypted authorized CIN does not match the at least one encrypted CIN from the consumer computer, and
distributing the protected software to consumers over at least one of a network and mail,
wherein the protected software, when activated, retrieves and encrypts at least one CIN from a consumer computer using said protection methodology and compares the encrypted CIN from the consumer computer with the at least one encrypted CIN in the protection mechanism and halts processing of the software if the encrypted authorized CIN does not match the encrypted CIN from the consumer computer.

53. The system of claim 52, wherein said step of automatically embedding comprises the step of automatically editing at least a portion of an executable file to place at least a portion of said protection mechanisms into the executable file to produce said protected software.

54. The system of claim 52, wherein said step of automatically embedding comprises the steps of:
automatically editing at least a portion of software source code to place at least one said protection mechanism into at least one predetermined stop point, where execution of the purchased software is terminated if a computer is not authorized to run the purchased software, in the software selected for purchase, and
at least one of compiling and linking the at least a portion of source code to produce said protected software.

55. The system of claim 52, further comprising the steps of:
identifying a consumer computer operation system where the protected software will be executed, and
automatically retrieving at least one of a computer processor serial number, a hard disk drive serial number, an operating system serial number, and a hardware serial numbers from a consumer computer.

56. A method for software copyright protection and sales on a server, said method comprising the steps of:
receiving requests to purchase software through at least one of a network and mail, generating software purchase information in response to such requests, encrypting at least one computer identification number (CIN) from a consumer computer to produce at least one encrypted authorized CIN using a protection methodology, the protection methodology including a null encryption of the CIN producing the CIN as the encrypted CIN, automatically embedding at least one protection mechanism into software selected for purchase to produce the protected software, the embedded protection mechanism including the at least one encrypted authorized CIN, the embedded protection mechanism reading in the at least one CIN from a consumer computer, encrypting the at least one CIN from a consumer computer to produce at least one encrypted CIN using the protection methodology, comparing the at least one encrypted CIN from the consumer computer with the at least one encrypted authorized CIN in the protection mechanism, and halting and continuing processing of the software if the encrypted authorized CIN does not match the at least one encrypted CIN from the consumer computer, and distributing the protected software to consumers over at least one of a network and mail, wherein the protected software distributed by the software distribution method, when activated, retrieves and encrypts at least one CIN from a consumer computer and compares the encrypted CIN from the consumer computer with the at least one encrypted authorized CIN in the protection mechanism and halts processing of the software if the encrypted authorized CIN does not match the at least one encrypted CIN from the consumer computer, wherein said step of automatically embedding further comprises the step of automatically editing at least a portion of an executable file to place at least a portion of the protection mechanisms into the executable file to produce the protected software, wherein said step of automatically editing further comprises the steps of:
  determining whether an executable file embedded with at least one protection mechanism containing at least one predetermined dummy number of the purchased software exists,
  making a copy of the purchased software source code if an executable file with the at least one dummy number of the purchased software does not exist as determined by the determining step,
  locating the stop points in the purchased software,
  adding the protection mechanisms containing at least one dummy number to the stop points in the purchased software,
  selecting a compiler and at least one of compiling and linking the modified at least a portion of the purchased software source code using the compiler to generate the executable file,
  encrypting the at least one CIN using a protection methodology to produce at least one the encrypted authorized CIN, regardless of whether an executable file with the at least one dummy number of the purchased software does exist as determined by the determining step, and
  replacing the embedded dummy numbers with the at least one encrypted authorized CIN to generate the protected software.

57. A method for software copyright protection and sales on a server, said method comprising the steps of:

receiving requests to purchase software over a network and generating software purchase information in response to such requests, encrypting at least one computer identification number (CIN) from a consumer computer to produce at least one encrypted authorized CIN using a protection methodology, the protection methodology including a null encryption of the CIN producing the CIN as the encrypted CIN, automatically embedding at least one protection mechanism into software selected for purchase to produce the protected software, the embedded protection mechanism including the at least one encrypted authorized CIN, the embedded protection mechanism reading in the at least one CIN from a consumer computer, encrypting the at least one CIN from a consumer computer to produce at least one encrypted CIN using the protection methodology, comparing the at least one encrypted CIN from the consumer computer with the at least one encrypted authorized CIN in the protection mechanism, and halting and continuing processing of the software if the encrypted authorized CIN does not match the at least one encrypted CIN from the consumer computer, and distributing the protected software to consumers over at least one of a network and mail, wherein the protected software distributed by the software distribution method, when activated, retrieves and encrypts at least one CIN from a consumer computer and compares the encrypted CIN from the consumer computer with the at least one encrypted authorized CIN in the protection mechanism and halts processing of the software if the encrypted authorized CIN does not match the at least one encrypted CIN from the consumer computer, and wherein said step of automatically embedding further comprises the steps of:
  automatically editing at least a portion of software source code to place at least one the protection mechanism into at least one the predetermined stop point in the software selected for purchase, and
  at least one of compiling and linking the at least a portion of the software source code to produce the protected software embedded with the protection mechanisms, and wherein said step of automatically embedding further comprises the steps of:
  making a copy of the at least a portion of the purchased software source code,
  encrypting the at least one CIN using a protection methodology to produce the at least one encrypted CIN,
  adding into a protection mechanism the at least one encrypted CIN to produce embedded encrypted authorized CIN;
  locating stop points in the at least a portion of the purchased software,
  adding the protection mechanisms to the stop points in the at least a portion of the purchased software source code, and
  selecting a compiler and at least one of compiling and linking the modified at least a portion of the purchased software source code using the compiler to generate the protected software.

* * * * *